United States Patent
Lee

(10) Patent No.: US 8,224,805 B2
(45) Date of Patent: Jul. 17, 2012

(54) METHOD FOR GENERATING CONTEXT HIERARCHY AND SYSTEM FOR GENERATING CONTEXT HIERARCHY

(75) Inventor: Won Suk Lee, Seoul (KR)

(73) Assignee: Industry-Academic Cooperation Foundation, Yonsei University Yonsei Univ., Seoul (KR)

( * ) Notice: Subject to any disclaimer, the term of this patent is extended or adjusted under 35 U.S.C. 154(b) by 0 days.

(21) Appl. No.: 13/051,914

(22) Filed: Mar. 18, 2011

(65) Prior Publication Data
US 2012/0041979 A1 Feb. 16, 2012

(30) Foreign Application Priority Data
Aug. 12, 2010 (KR) .................. 10-2010-0077740

(51) Int. Cl.
G06F 17/30 (2006.01)
(52) U.S. Cl. ........................ 707/711; 707/797

(58) Field of Classification Search .................. 707/711, 707/797
See application file for complete search history.

(56) References Cited

U.S. PATENT DOCUMENTS

| 6,185,559 | B1 * | 2/2001 | Brin et al. ...................... 707/758 |
| 6,253,195 | B1 * | 6/2001 | Hudis et al. .................... 707/713 |
| 6,339,767 | B1 * | 1/2002 | Rivette et al. .................. 707/781 |
| 6,826,568 | B2 * | 11/2004 | Bernstein et al. .............. 707/749 |
| 7,158,963 | B2 * | 1/2007 | Galindo-Legaria et al. .. 707/718 |
| 7,158,975 | B2 * | 1/2007 | Mazzagatti ..................... 707/797 |
| 7,324,999 | B2 * | 1/2008 | Judd .............................. 707/690 |
| 7,664,727 | B2 * | 2/2010 | Van Doan et al. ............. 707/797 |
| 7,672,958 | B2 * | 3/2010 | Meyer et al. ................... 707/758 |
| 7,747,653 | B2 * | 6/2010 | Srinivas et al. ................ 707/797 |

* cited by examiner

Primary Examiner — Kim Nguyen

(57) ABSTRACT

The present disclosure relates to a method for generating a context hierarchy and a system for generating a context hierarchy, and more particularly, to a method for generating a context hierarchy from data streams configured of an infinite set of continuously transactions and a system for generating a context hierarchy from the data streams.

18 Claims, 24 Drawing Sheets

FIG. 5
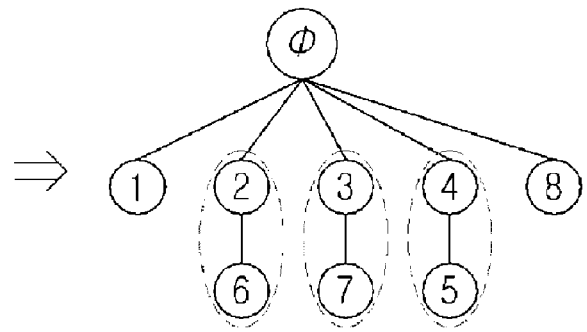
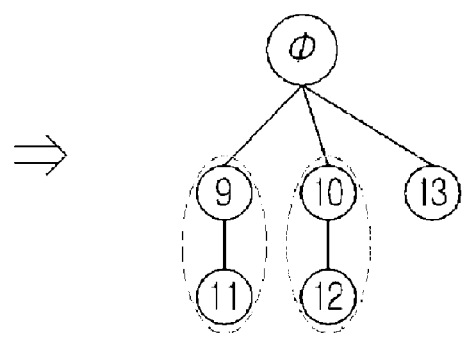
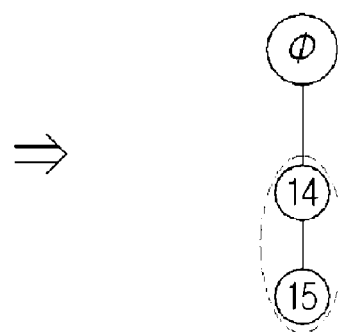

FIG. 8

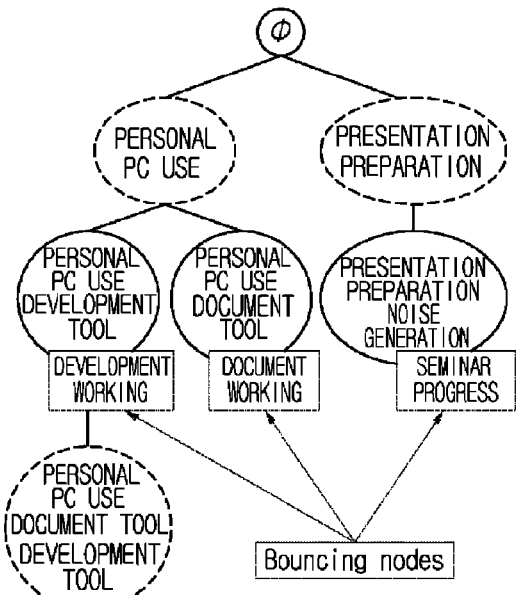

| T# | Itemset |
|---|---|
| 1 | PERSONAL PC USE |
| 2 | DEVELOPMENT TOOL |
| 3 | PERSONAL PC USE DEVELOPMENT TOOL DOCUMENT TOOL |
| 4 | PERSONAL PC USE DEVELOPMENT TOOL |
| 5 | PRESENTATION PREPARATION |
| 6 | PRESENTATION PREPARATION NOISE GENERATION |
| 7 | DOCUMENT TOOL |
| 8 | PRESENTATION PREPARATION |
| 9 | PERSONAL PC USE DEVELOPMENT TOOL |
| 10 | PERSONAL PC USE DOCUMENT TOOL |
| 11 | PERSONAL PC USE DEVELOPMENT TOOL DOCUMENT TOOL |
| | ⋮ |

(a)

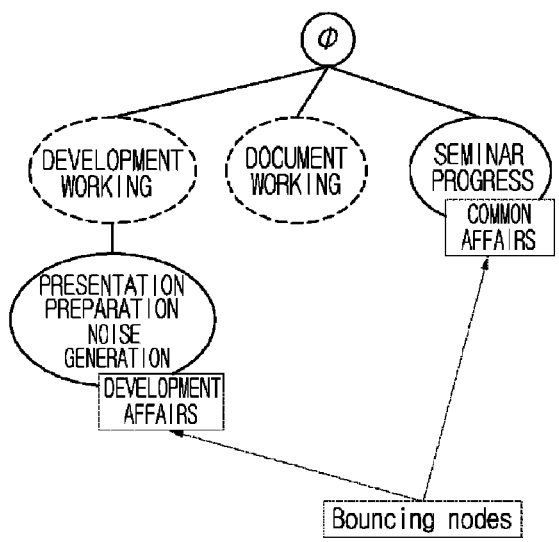

| T# | Itemset |
|---|---|
| 1 | - |
| 2 | - |
| 3 | DEVELOPMENT WORKING DOCUMENT WORKING |
| 4 | DEVELOPMENT WORKING |
| 5 | - |
| 6 | SEMINAR PROGRESS |
| 7 | - |
| 8 | - |
| 9 | DEVELOPMENT WORKING |
| 10 | DOCUMENT WORKING |
| 11 | DEVELOPMENT WORKING DOCUMENT WORKING |
| | ⋮ |

(b)

```
input: dataset D_k with k transactions
output: Context hierarchy
ℓ: context range, δ: maximum context range
S_min: minimum support
S_upper: upper bound of current boundary
S_low: low bound of current boundary
CT: set of contexts on context tree
CI: candidate itemset of current boundary
BN: bouncing information of current layer algorithm Bottom-upContextDetection
1   initialize(CH); initialize(CT);
2   while(!user_request.stop() || no_new_contexts)
3       CT = ContextTreeComposition(D_k);
4       BN = get_bouncing_info(CT);
5       for all context c s.t. c ∈ CT;
6           CH.set_context(c, current_layer);
7       end for
8       D_k' = null;
9       for all transaction t s.t. t ∈ D_k
10          t' = null;
11          for all itemset m s.t. m ⊆ t
12              if( m ⊆ t )
13                  t' = t' + BN.get_index(m);
14              end if
15          end for
16          D_k' = D_k' ∪ t';
17      end for
18      D_k = D_k';
19  end while (a)
```

```
algorithm ContextTreeComposition
1   P_k = frequent_itemset_mining(D_k, S_min);
2   initialize(CI);
3   while(S_upper > S_min)
4       if(first_boundary)
5           S_upper = 1.0; S_low = S_upper − ℓ ;
6       else
7           S_upper = S_low ; S_low = S_upper − ℓ ;
8       end if
9       for all itemset m s.t. m ∈ P_k
10          if m is the shortest node in current branch on P_k
11              CI = CI ∪ m
12          end if
13      end for
14      D_k' = null; P_k' = null;
15      for all transaction t s.t. t ∈ P_k
16          t' = null;
17          for all itemset m s.t. m ∈ CI
18              if( m ⊆ t )
19                  t' = t' + CI.get_index(m);
20              end if
21          end for
22          D_k' = D_k' ∪ t';
23      end for
24      P_k' = frequent_itemset_mining(D_k');
25  end while
26  C_supper = null;
27  for all itemset m s.t SCV(m) ≤ δ & m ∈ P_k'
28      C_supper = longest itemset node n s.t. n ∈ CT & m ⊂ n
29      CT = CT ∪ {m}; C_supper.set_chile({m});
30  end for
31  return CT;

| attribute number | attribute name | data type |
|---|---|---|
| 1 | Sample code number | id number |
| 2 | Clump Thickness | 1-10 |
| 3 | Uniformity of Cell Size | 1-10 |
| 4 | Uniformity of Cell Shape | 1-10 |
| 5 | Marginal Adhesion | 1-10 |
| 6 | Single Epithelial Cell Size | 1-10 |
| 7 | Bare Nuclei | 1-10 |
| 8 | Bland Chromatin | 1-10 |
| 9 | Normal Nucleoli | 1-10 |
| 10 | Mitoses | 1-10 |
| 11 | Class | 2 for begin, 4 for malignant |

FIG. 14
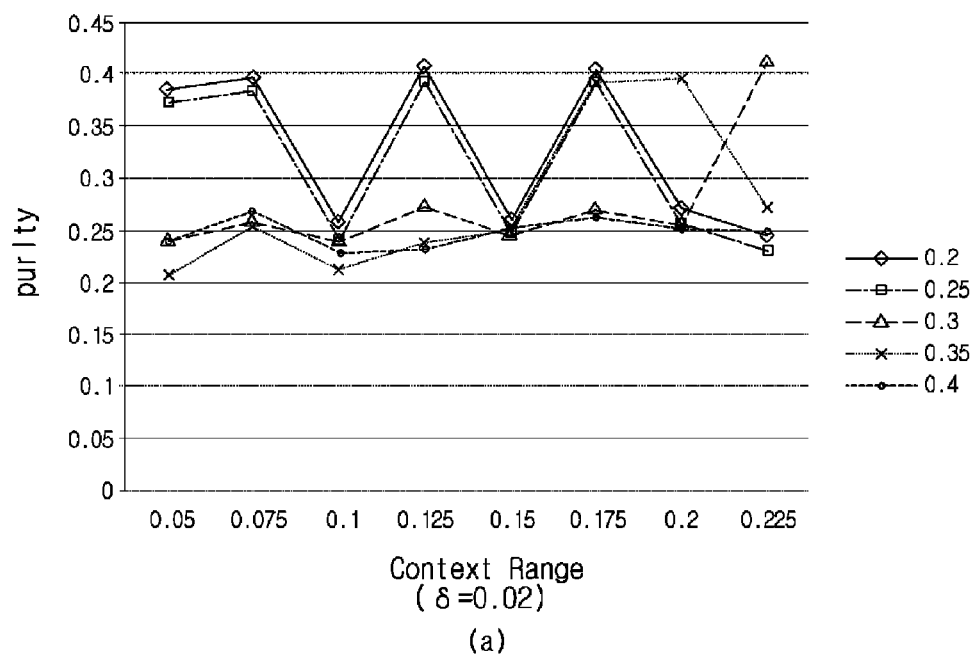
(a)
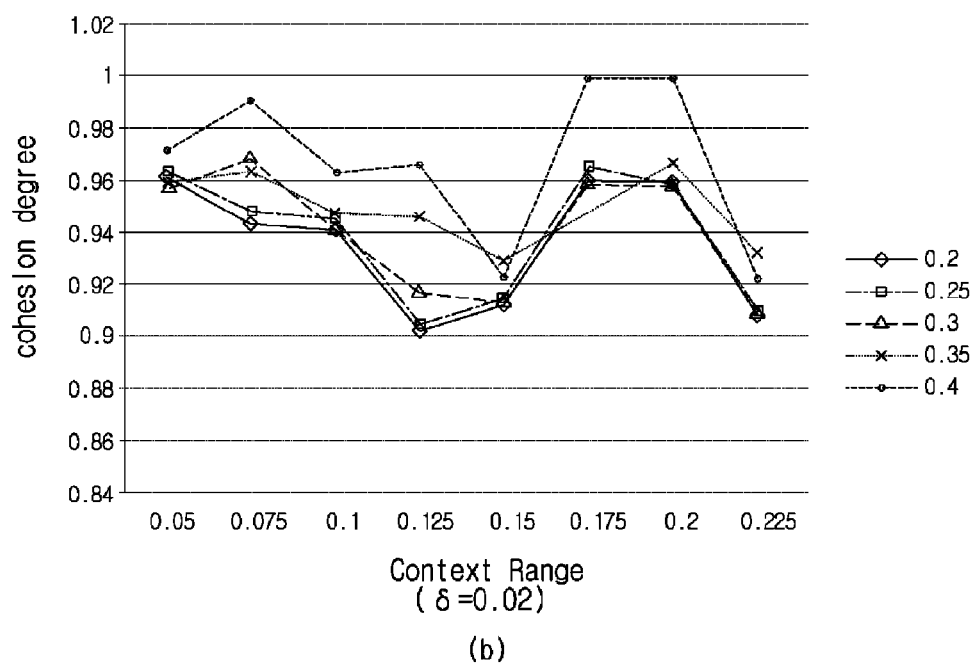
(b)

FIG. 15
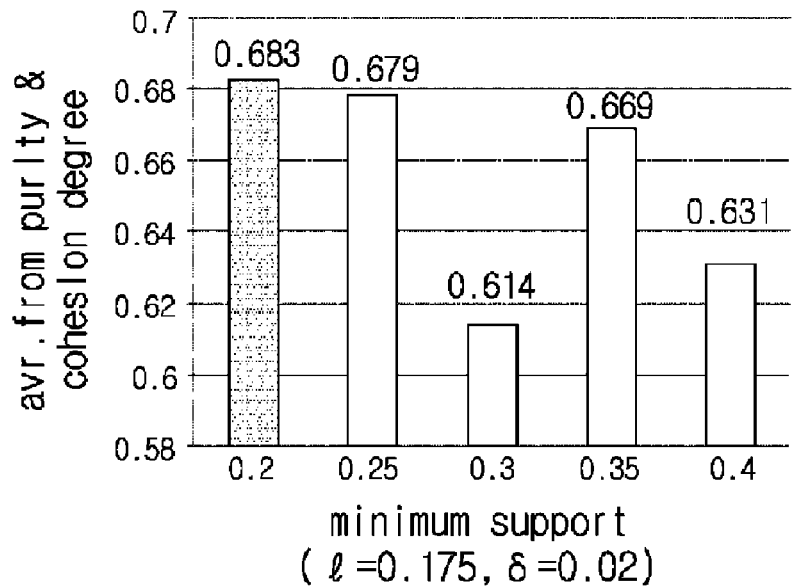
(a)
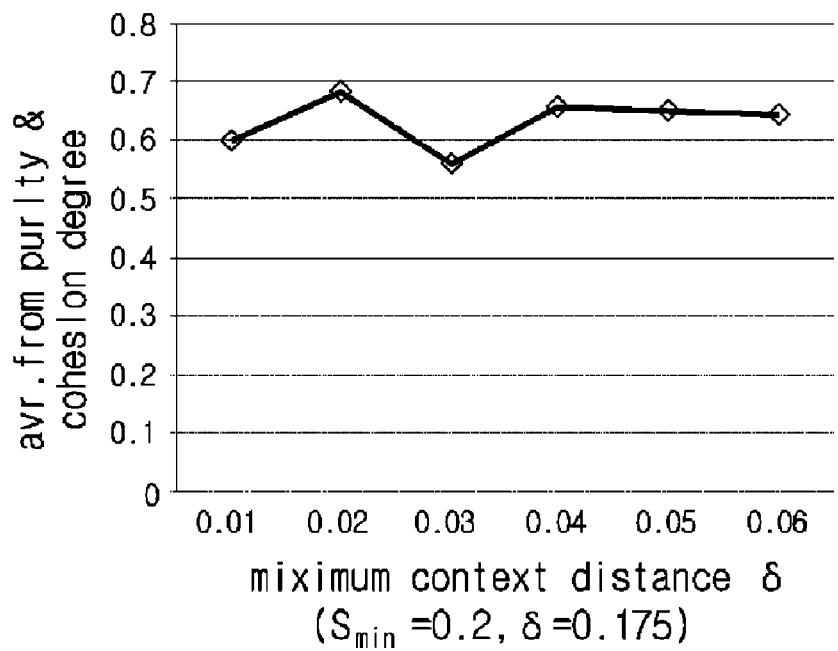
(b)

FIG. 16
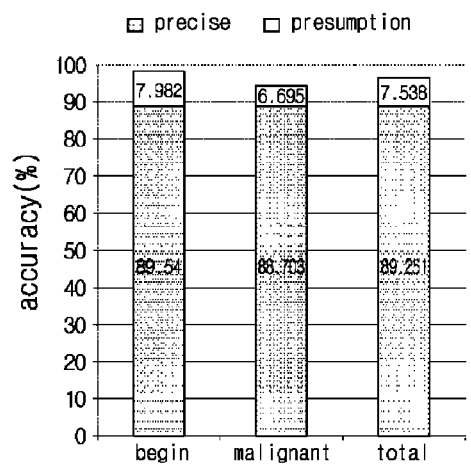
(a)
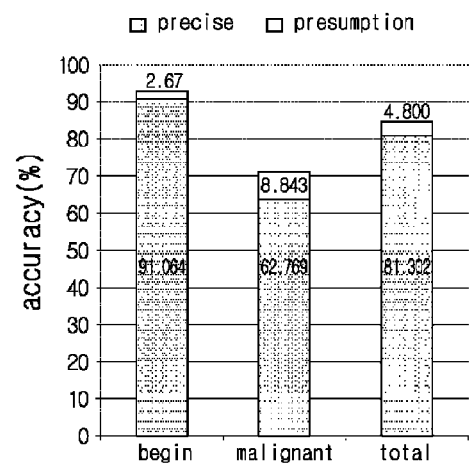
(b)
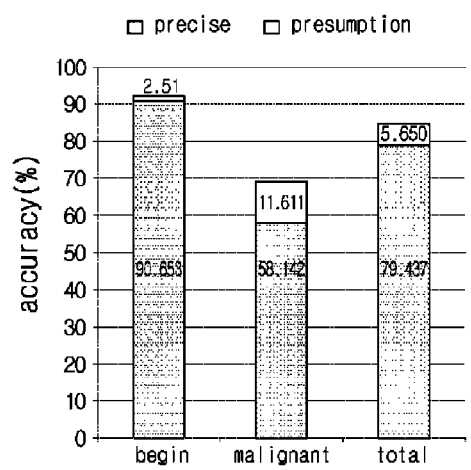
(c)
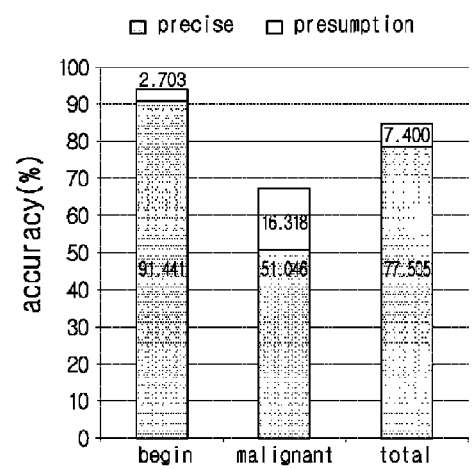
(d)

FIG. 17
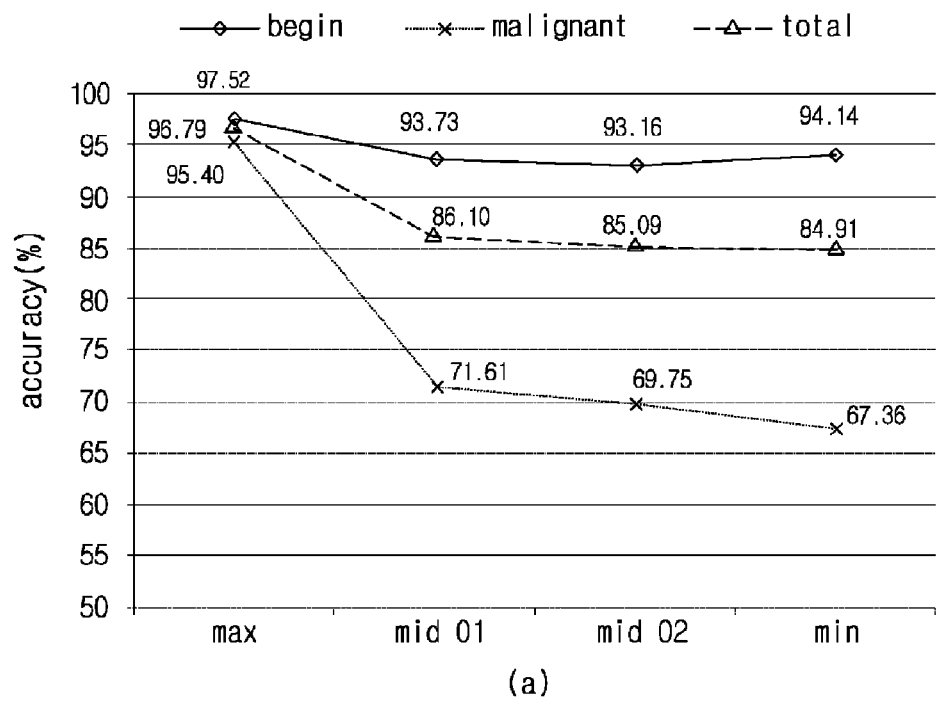
(a)
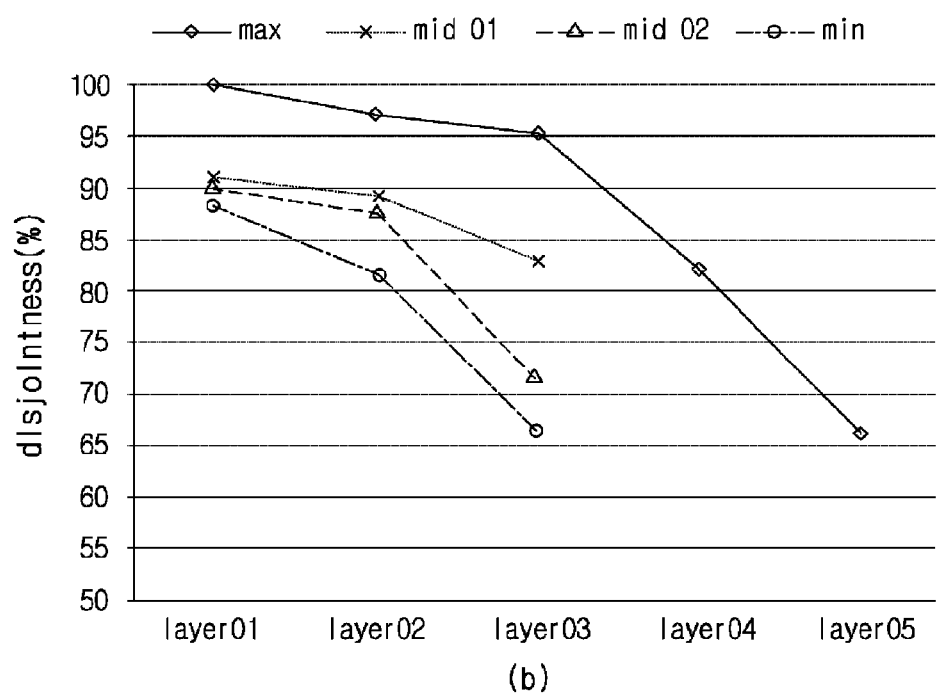
(b)

FIG. 18

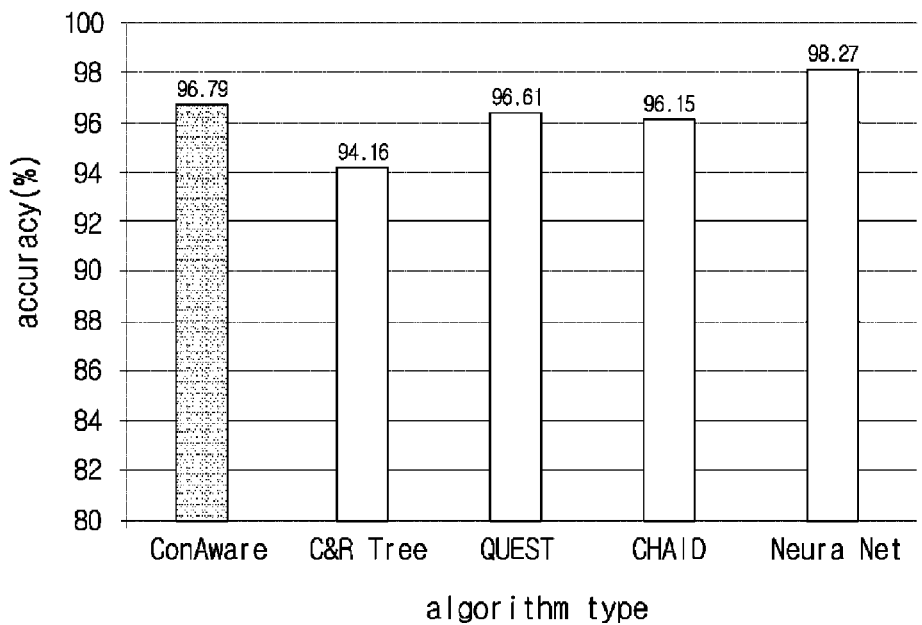

FIG. 19

| algorithm | parameter values | |
|---|---|---|
| C&R Tree | maximum tree depth:5 | maximum surrogates:5 |
| | minimum change in impurity:0.0001 | impurity measure:Gini |
| QUEST | maximum tree depth:5 | maximum surrogates:5 |
| | alpha for splitting:0.06 | |
| CHAID | maximum tree depth:5 | alpha for splitting:0.05 |
| | alpha for merging:0.05 | Chi-Square:Pearson |
| | epsilon for convergence:0.001 | maximum iterations:100 |
| Neural Network | method:dynamic | prevent overtraining sample:50% |
| | stop on:default | memory optimized |

| attribute number | attribute name | data type |
|---|---|---|
| 1 | parents | usual, pretentious, great_pret |
| 2 | has_nurs | proper, less_proper, improper, critical, very_crit |
| 3 | form | complete, completed, incomplete, foster |
| 4 | children | 1,2,3,more |
| 5 | housing | comvenient, less_conv, critical |
| 6 | finance | convenient, inconv |
| 7 | social | non_prob, slightly_prob, problematic |
| 8 | health | recommended, priority, not_recom |

FIG. 23
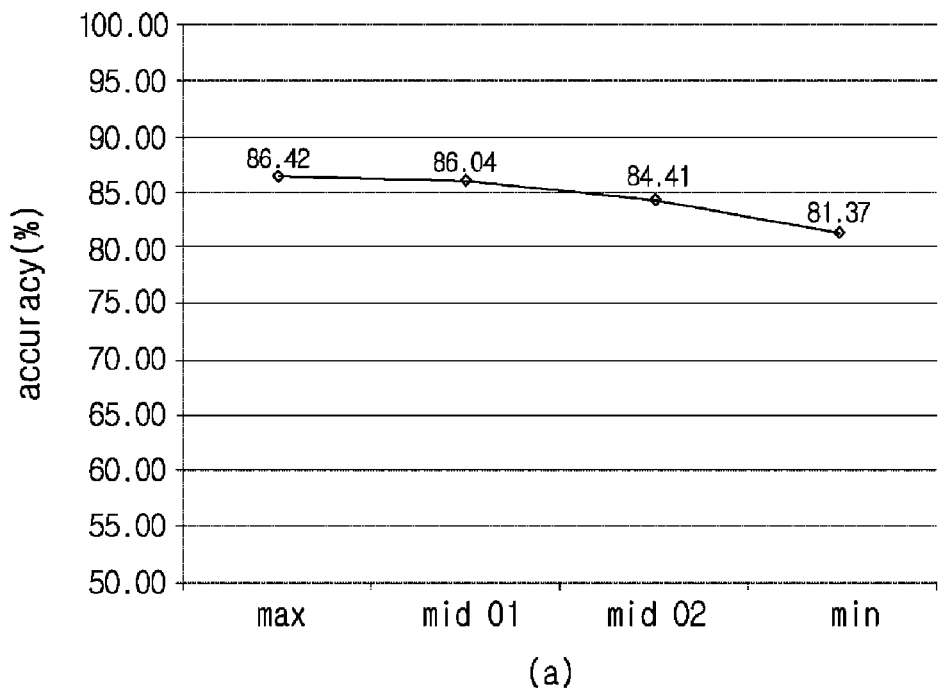
(a)
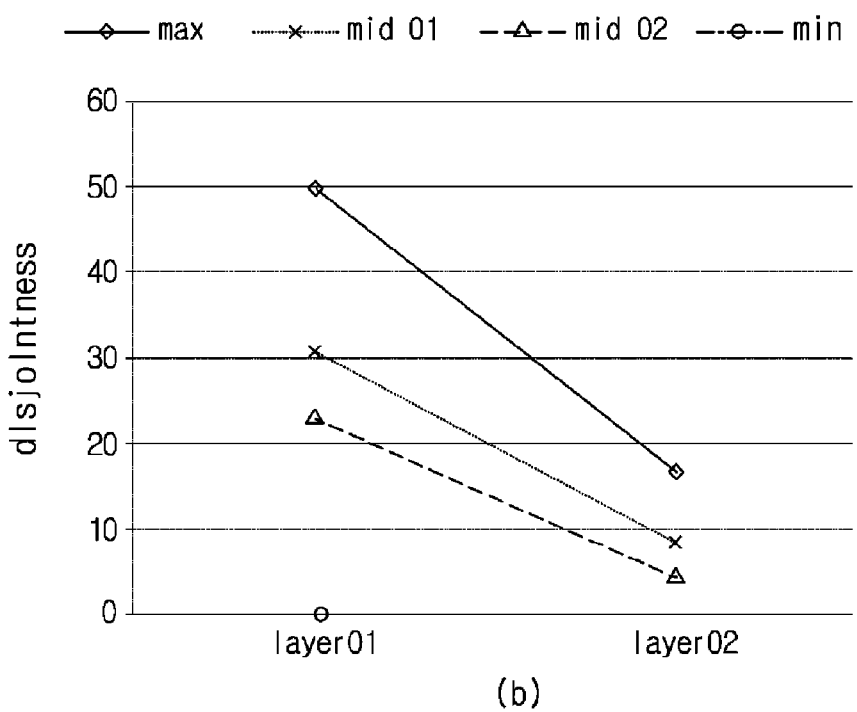
(b)

FIG. 24

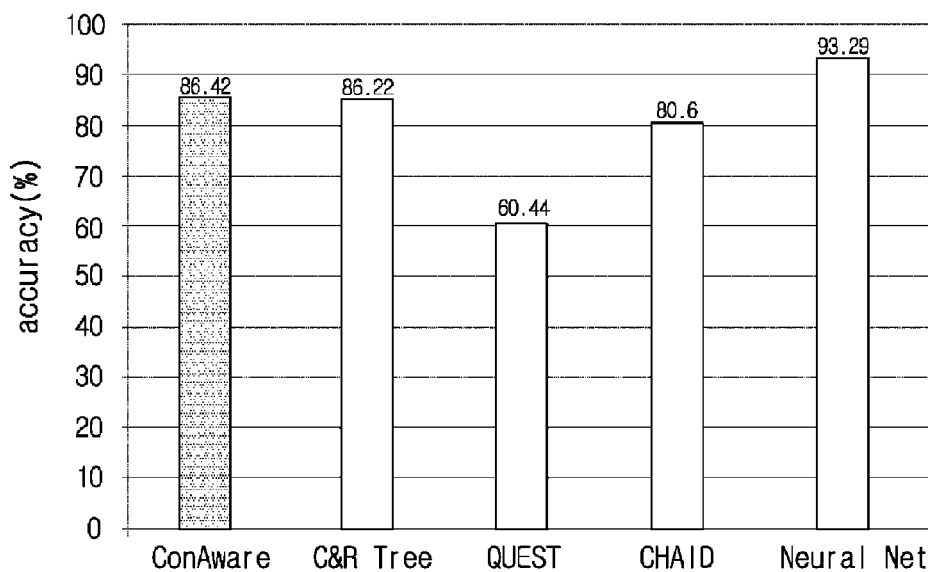

FIG. 25

| algorithm | parameter values | |
|---|---|---|
| C&R Tree | maximum tree depth:5 | maximum surrogates:5 |
| | minimum change in impurity:0.0001 | impurity measure:Gini |
| QUEST | maximum tree depth:5 | maximum surrogates:5 |
| | alpha for splitting:0.06 | |
| CHAID | maximum tree depth:5 | alpha for splitting:0.05 |
| | alpha for merging:0.05 | Chi-Square:Pearson |
| | epsilon for convergence:0.001 | maximum iterations:100 |
| Neural Network | method:dynamic | prevent overtraining sample:50% |
| | stop on:default | memory optimized |

FIG. 26
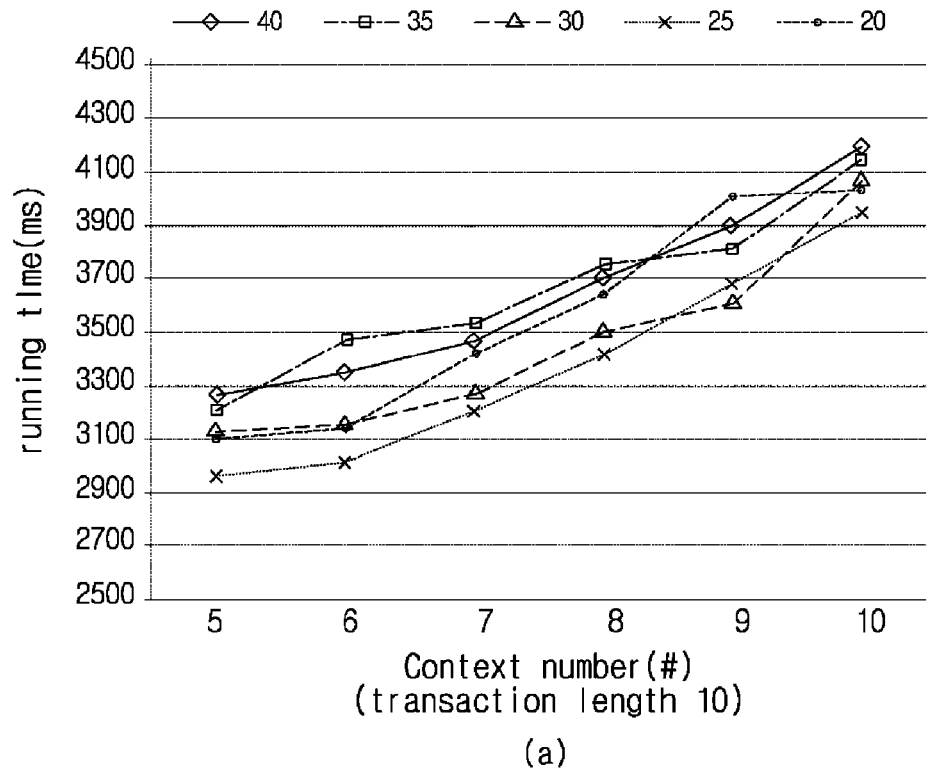
(a)
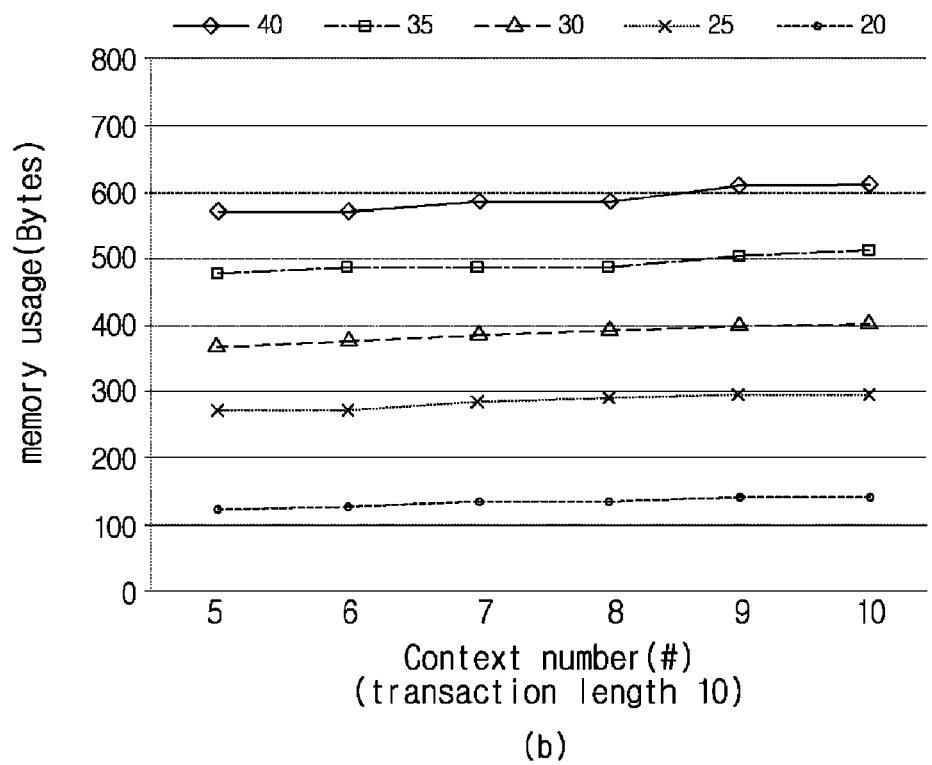
(b)

FIG. 27
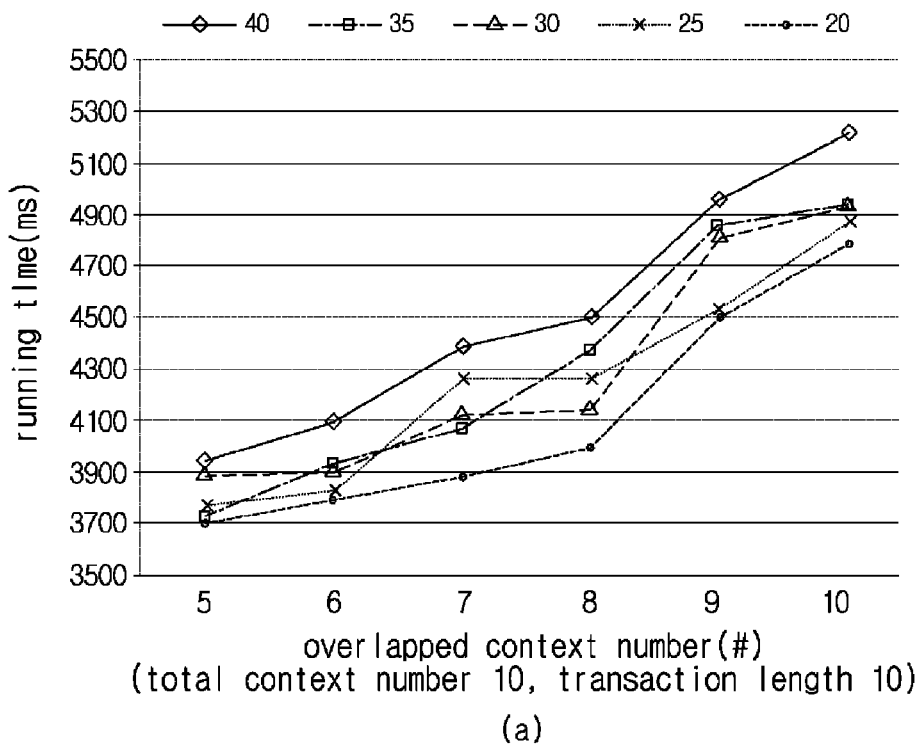
(a)
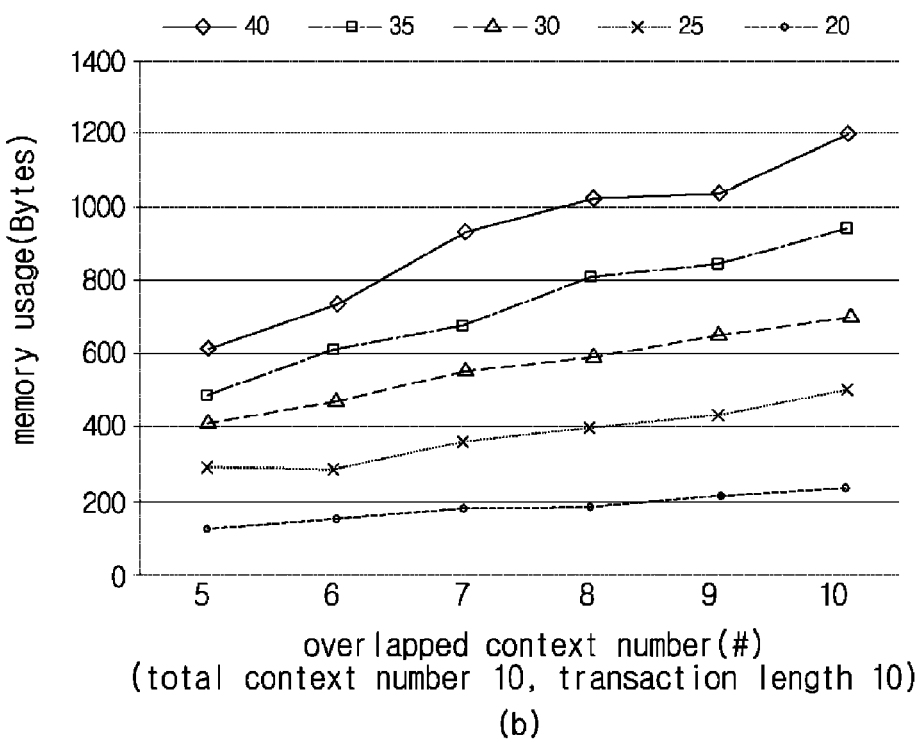
(b)

FIG. 28
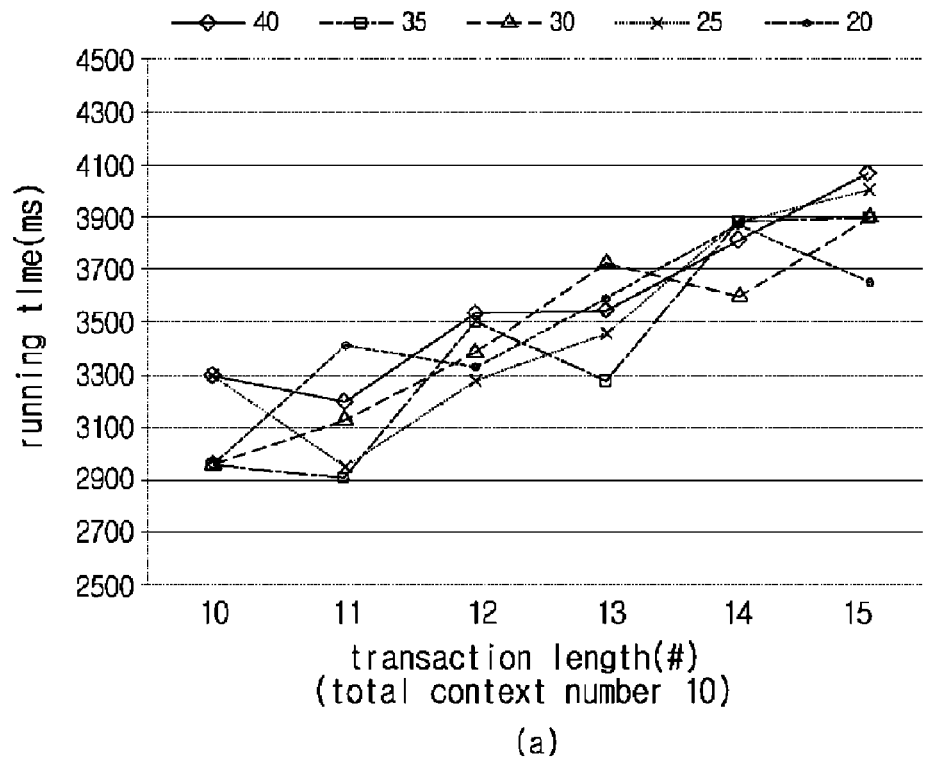
(a)
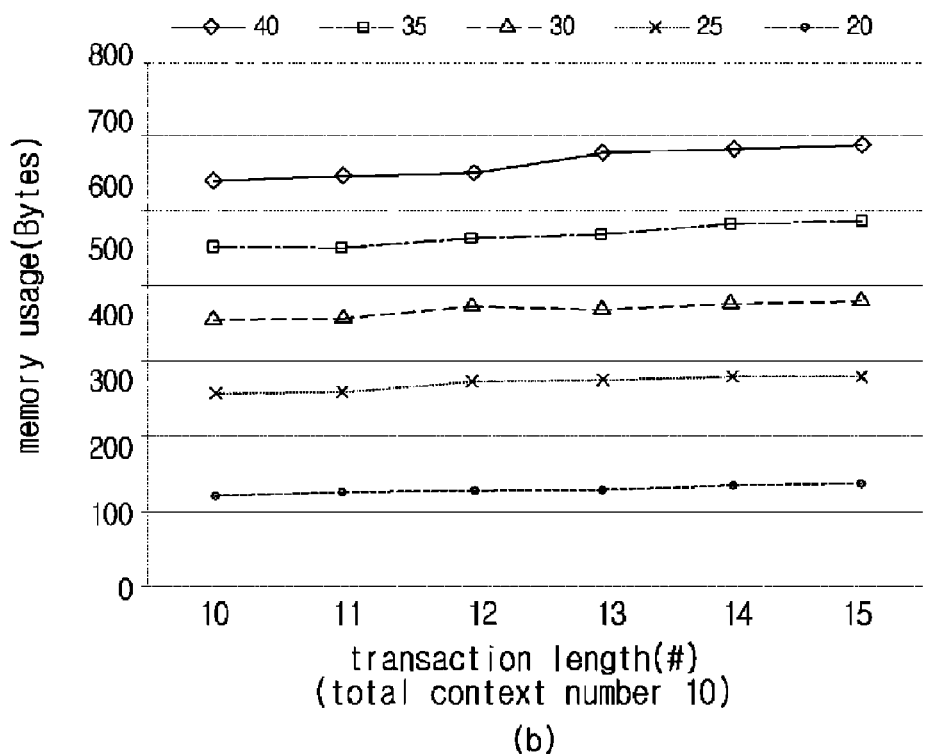
(b)

METHOD FOR GENERATING CONTEXT HIERARCHY AND SYSTEM FOR GENERATING CONTEXT HIERARCHY

CROSS-REFERENCE TO RELATED APPLICATIONS

This application claims priority to and the benefit of Korean Patent Application No. 10-2010-0077740 filed in the Korean Intellectual Property Office on Aug. 12, 2010, the entire contents of which are incorporated herein by reference.

TECHNICAL FIELD

The present invention relates to a method for generating context hierarchy and a system for generating a context hierarchy, and more particularly, to a method for generating a context hierarchy from data streams configured of an infinite set of continuously generated transactions and a system for generating a context hierarchy from the data streams.

BACKGROUND

In recent, a variety of high-performance sensors having different types and functions are closely connected with a living environment and are variously distributed, such that an amount of information that can be obtained from the sensors has been rapidly increased. Therefore, applicability and necessity of existing mining technologies for a huge amount of real-time information (data) are considered as important issues. Real-time data stream mining technologies in various methods have been proposed.

As a representative algorithm finding frequent itemsets from a finite set of transactions, an Apriori algorithm has been proposed in <R. Agrawal, R. Strikant, "Fast Algorithms fir Mining Association Rules," In Proceeding of the 20th International Conference on Very Large Database, pp. 487-499, 1994.>. The above-mentioned Apriori algorithm generates a candidate set n times in order to find frequent itemsets having a length of n and attempts transaction information finding n+1 times, such that memory usage is very large and the time consumed to search becomes long. Further, a Carma algorithm has been proposed in <C. Hidber, "Online Association Rule Mining," In Proceedings of the 21st International Conference on Very Large Data Bases, pp. 432-444, 1995.>. The Carma algorithm searches the transactions in the data set through a two-stage processing process to find the frequent itemsets. An algorithm of finding frequent itemsets targeting the fixed data set is inappropriate as a mining method under a real-time data stream environment as a definition timing of an analysis object should be before mining and scanning working is necessarily performed once or more.

In an environment where the data set is gradually increased, synthetic mining results for a newly updated data set can be obtained using a gradual frequent itemset mining algorithm such as an FUP-based algorithm that is disclosed in <D. Cheung, J. Han, V. Ng, and C. Y. Wong, "Maintenance of Discovered Association Rules in Large Databases: An Incremental Updating Technique," In Proceedings of the 12th international Conference on Data Engineering, pp. 106-114, 1996>, <D. Cheung, S. D. Lee, and B. Kao, "A general Incremental Technique for Maintaining Discovered Association Rules," In Proceedings of the 5th International conference on Databases Systems for Advanced Application, pp. 185-194, 1997.>. Since the gradual mining algorithm may use previous transaction information in order to obtain latest results but should store all of the information on each of the transactions and find the previous transaction in order to accurately calculate support, it is inappropriate as a method of data streams. In a Lossy Counting algorithm proposed in <G. S. Manku and R. Motwani, "Approximate Frequency Counts over Data Streams," In Proceedings of the 28th International Conference on Very Large Databases, pp. 346-357, 2002>, the frequent itemsets are found by limiting the memory usage to a predetermined range during a process of finding frequent itemsets. However, in order to obtain high efficiency in the Lossy Counting algorithm, a memory space should be used in proportion to the efficiency, which affects an increase in mining run time.

In order to efficiently find the frequent itemsets in the real-time data stream environment, an estDec algorithm has bee proposed in <Joong Hyuk Chang, Won Suk Lee, "Finding recent frequent itemsets adaptively over online data streams," In proceedings of the 9th ACM SIGKDD international conference on Knowledge Discovery and Data Mining, pp. 487-492, 2003.>. The estDec algorithm processes the transactions configuring the data streams as soon as the transactions are generated and manages an appearance frequency of itemsets appearing in the transactions by using a monitoring tree having a prefix tree structure without generating a candidate set for generating the frequent itemsets. The estDec algorithm maintains high efficiency by managing only the important itemsets that are likely to become frequent itemsets through delay addition and pruning.

The above-mentioned various kinds of mining methods may easily derive meaning items included in given information, but is not actually easy to detect ready-to-use semantic information included in the given information. Therefore, various methods have been proposed in order to derive the semantic information. Among those, as a method of using a data stream based clustering mechanism, an MC-Stream method that derives meanings through an abstraction step based on event information previously defined by a user has been proposed in <YongChul Kwon, Wing Yee Lee, Magdalena Balazinska, "Clustering Events on Streams using Complex Context Information," In Proceedings of the IEEE International Conference on Data Mining Workshops, pp. 238-247, 2008>. The method, which replaces a distance measuring method with a semantic-based measuring method based on a representative stream based clustering algorithm, measures the semantic distance using similarity such as pre-defined time, belongings, etc., to generate clusters.

In addition to the above-mentioned algorithms, various real-time data stream mining technologies have been proposed, but a plurality of algorithms in addition to the above-mentioned algorithms that can actively detect the semantic information included in the real-time data streams, that is, the semantic information on the real-time state of the corresponding domain and use the information are insufficient. Most of the semantic approach methods merely use predefined context information from a user or predict current context through previous information. Therefore, there is no method for solving a problem caused when basic information is not present.

SUMMARY

An object of the present invention is to assign automated context judgment ability to an algorithm user to serve as a more efficient service provider even under the situation where there are no basic data by actively deriving valued context information that is not handled in existing researches through semantic analysis of real-time data streams.

An exemplary embodiment of the present invention provides a method for generating a context hierarchy, the method including: (a) vertically projecting a frequent itemset tree for continuously generated transactions into a plurality of boundaries and generating new first transactions and new frequent itemset trees of each boundary by assigning an index to basic itemsets of each boundary; (b) detecting ones of the frequent itemsets of the new frequent itemset trees as a single context when the difference in support is a predetermined value or less and generating a context trees of a hierarchical structure based on the detected contexts; (c) generating a lowermost layer having a context hierarchy by assigning a new name to only contexts selected in the context trees; (d) generating new second transactions for a subsequent layer as a new name assigned in a previous step and generating new context trees; and (e) determining that there are no selectable contexts in the contexts of the new context trees and if not, ending the generation of the context hierarchy and if so, repeatedly performing the process from step (d) after assigning the new name to each context by selecting appropriate contexts and generating the subsequent layer having the context hierarchy.

Another exemplary embodiment of the present invention provides a system for generating a context hierarchy, the system including: a frequent itemset tree generator generating frequent itemset trees for continuously generated transactions; a context tree generator detecting ones of the frequent itemsets of the new frequent itemset trees as a single context when a difference in support is a predetermined value or less and generating the context tree having a hierarchical structure based on the detected contexts, after vertically projecting the frequent itemset trees into a plurality of boundaries and assigning indexes to basic itemsets of each boundary to generate new first transactions and new frequent itemset trees; and a context hierarchy generator determining that there are no selectable contexts in the contexts of the new context trees and if not, ending the generation of the context hierarchy and if so, selecting the appropriately contexts to assign the new name to each context and after generating the subsequent layer having the context hierarchy, and repeatedly performing the process from a process generating new second transactions for a subsequent layer as the new name, after generating a lowermost layer having a context hierarchy by assigning a new name to only contexts selected in the context trees and generating new second transactions for a subsequent layer as a new name and generating new context trees.

As set forth above, the method for generating a context hierarchy and the system for generating context hierarchy a context hierarchy according to the exemplary embodiments of the present invention are an active method that can semantically derive only items estimated as single situation as results to increase readability of final results and efficiently derive correlation, hierarchical relations, etc., between detected situations. Therefore, the exemplary embodiment of the present invention can assign automated situation judgment ability to the algorithm user under even the situation where there is no basic data to serve as the more efficient service provider.

BRIEF DESCRIPTION OF THE DRAWINGS

FIG. 5 is a diagram showing an example of a new frequent itemset tree of each boundary generated by performing second frequent itemset mining on each boundary of FIG. 4;

FIG. 8A is a diagram showing an example of generating a situation tree of an upper layer next to a lowermost layer based on the new transactions of FIG. 7;

FIG. 8B is a diagram showing an example of generating the situation tree of the upper layer next to the lowermost layer based on the new transactions of FIG. 7;

FIGS. 9A and 9B are algorithms showing a bottom-up context detection method according to FIGS. 7 and 8;

FIGS. 12 to 19 are diagrams showing a first experiment for verifying performance of the method for generating a context hierarchy according to the exemplary embodiment of the present invention;

FIG. 12 is a table showing attributes of data used in the first experiment for verifying the performance of the method for generating a context hierarchy according to the exemplary embodiment of the present invention;

FIG. 13 is a diagram showing results of comparing evaluation measurement values according to a minimum support and a context range after performing context detection by optionally extracting 80% of instant;

FIG. 14 is a diagram showing results of comparing purity and cohesion degree according to a minimum support and a context range;

FIG. 15 is a diagram showing results of comparing evaluation measurement values according to a minimum support and a context distance;

FIG. 16 is a diagram showing results of performing a comparison experiment of precision of context hierarchies having each evaluation measurement value;

FIG. 17 is a diagram showing results of comparing precision of a context hierarchy having each evaluation measurement value and disjointness for each layer after performing context detection through remaining instants other than instant of 80% performed during the experiment of FIG. 13;

FIG. 18 is a diagram showing experiment results of comparing precision calculated through a bottom-up context detection mechanism and precision of other representative classification algorithms and a neural network algorithm;

FIG. 19 is a table showing a detailed parameter history used in the experiment of FIG. 18;

FIGS. 20 to 24 are diagrams showing a second experiment for verifying performance of the method for generating a context hierarchy according to the exemplary embodiment of the present invention;

FIG. 20 is a table showing attributes of data used in the second experiment for verifying the performance of the method for generating a context hierarchy according to the exemplary embodiment of the present invention;

FIG. 21 is a diagram showing results of comparing evaluation measuring values according to a minimum support and a context range after performing context detection by optionally extracting 80% of instant;

FIG. 22 is a diagram showing results of performing a comparison experiment of precision of context hierarchies having each evaluation measurement value;

FIG. 23 is a diagram showing results of comparing precision of a context hierarchy having each evaluation measurement value and disjointness for each layer after performing context detection through remaining instants other than instant of 80% performed during the experiment of FIG. 21;

FIG. 24 is a diagram showing experiment results of comparing precision calculated through a bottom-up context detection mechanism and precision of other representative classification algorithms and a neural network algorithm;

FIG. 25 is a table showing a detailed parameter history used in the experiment of FIG. 24;

FIGS. 26 to 28 are diagrams showing a third experiment for verifying performance of the method for generating a context hierarchy according to the exemplary embodiment of the present invention;

FIG. 26 is a diagram showing results of measuring run time and maximum memory usage according to a change in the number of contexts found after performing the context detection;

FIG. 27 is a diagram showing results of measuring the run time and the maximum memory usage according to a change in the number of overlapping contexts; and FIG. 28 is a diagram showing results of measuring the run time and the maximum memory usage according to a change in transaction length.

DETAILED DESCRIPTION

Figure 1:
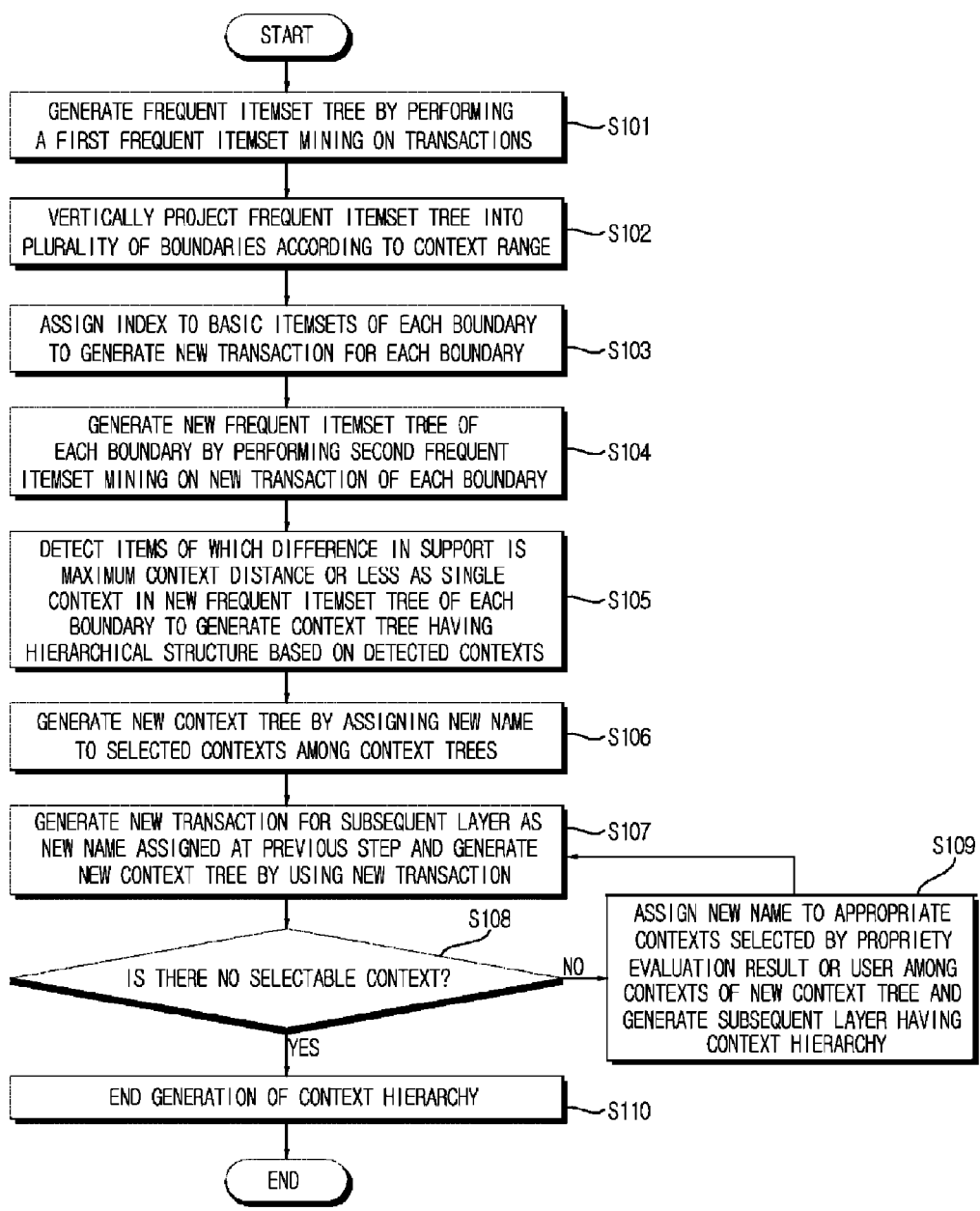
FIG. 1 is a flow chart showing a method for generating a context hierarchy according to an exemplary embodiment of the present invention.

A context detection method and a context detection system according to exemplary embodiments of the present invention will be described below with reference to accompanying drawings.

DEFINITION

First, prior to describing exemplary embodiments of the present invention, symbols to be used herein will be defined.

Data streams for mining frequent itemsets, which are an infinite set of transactions that are continuously generated, are defined as follows.

1) $I=\{i_1, i_2, i_3, \ldots, i_n\}$ is all the itemsets from a specific timing of the past up to now, where the item implies unit information generated at application domains.

2) When $2^I$ represents a power set of the set I, e satisfying $e \in \{2^I - \{\emptyset\}\}$ is referred to as an itemset, a length $|e|$ of the itemset implies the number of items configuring the itemset e, and any itemset e is defined as $|e|$-itemset according to the length of the corresponding itemset. Generally, 3-itemset {a, b, c} is simply represented by abc.

3) the transaction is a subset of I, not a null set and each transaction has a transaction identifier TID. The transaction added to the data set in an k-th order is represented by $T_k$ and the TID of $T_k$ is k.

4) when the new transaction $T_k$ is added, the current data set $D_k$ is configured of all the transactions that are generated and added until now, that is, $D_k = <T_1, T_2, \ldots, T_k>$. Therefore, $|D_k|$ implies the total number of transactions included in the current data set $D_k$.

5) When $T_k$ is referred to as current transaction, the current appearance frequency for any itemset e is defined as $C_k(e)$, which represents the number of transactions including e at the k transaction until now. Similarly, the current support $S_k(e)$ of the itemset e is defined as a ratio of the appearance frequency $C_k(e)$ of the itemset e to the total number of transactions $|D_k|$ until now. When the current support $S_k(e)$ of the itemset e is the previously defined minimum support $S_{min}$ or more, the itemset e is defined as the frequent itemset at the current data stream $D_k$.

[estDec]

Hereinafter, an "estDec method" used for the method for generating a context hierarchy according to the exemplary embodiment of the present invention will be described below.

The estDec method, which has been proposed to efficiently find the frequent itemsets at an on-line data stream environment among frequent itemset mining technologies, generates and simultaneously processes the transactions configuring the data streams and manages the appearance frequency of the itemsets appearing in the transactions by using the monitoring tree having the prefix tree hierarchy without generating the candidate sets for generating the frequent itemset. The prefix tree used in the estDec method is configured to include a route node having a null value and the remaining nodes corresponding to each frequent item, wherein each node includes the support information of the corresponding frequent items. Further, all the trees are configured in a dictionary order of the frequent items corresponding to each node and the frequent itemset represented by a specific node is configured of all the items on a path from the route node to the specific node.

[Context]

Hereinafter, the "context" in the "context hierarchy" acquired through the method for generating a context hierarchy according to the exemplary embodiment of the present invention will be described below.

Each context of the observation object is configured of a set of activities simultaneously performed at high probability or a set of states simultaneously generated at high probability. (Assumption 1)

In particular, the context in the transaction based stream environment that configures the transactions by mapping the activity or state of the observation object to each item may be represented as the subset configured of items where the trend of the increase or reduction of the support value is smooth even though the number of items included in the subsets of all the frequent itemsets for the corresponding domain is changed. Support changing velocity (SCV(S, x)) associated with the changing rate of the support value is defined as the following Equation 1 at the timing when a new item x is added to S in the case where all the frequent itemsets I for the specific domain and the subset S thereof are given.

$$SCV(S,x) = \text{Support Reduction Rate of } S/\text{Increase in length of Frequent Itemset of } S \quad [\text{Equation 1}]$$

In other words, the maximum frequent itemset for a boundary where the support changing velocity (SCV(S, x)) is a predetermined level or less implies the specific context and the support changing velocity in the same context is smaller than the support changing velocity for the items included in different contexts. For example, when each of the itemsets abc and abcd has the minimum support of 0.8 and 0.5 and has different contexts, the support changing velocity is 0.3 by dividing the support reduction rate by the length change and always satisfies a condition of SCV(ab,c)≧SCV(abc,d).

For all the itemsets I for the specific domain and the set $C=\{C_1, C_2, \ldots, C_n\}$ of all the contexts present in the domain, the minimum condition where each context $C_k(1 \leq k \leq n)$ should satisfies is as the following Equation 2.

$$C_k \in \{2^I - \emptyset\}, S(C_k) \geq S_{min} \text{(However, } 2^I \text{ is a power set of } I)$$ [Equation 2]

In this case, for the items x, y, and z that is s,y,z∈I, when x,y∈Ci, z∈Cj, and i≠j, the context is defined by Ci that always satisfies the following Equation 3.

$$SC(\{x\},y) > SCV(\{x\},z)$$ [Equation 3]

In particular, when the transaction set belonging to the context $C_i$ among all the transaction sets T is referred to as $T_i$, if the transactions satisfying $T_i \cap T_j = \emptyset (i \neq j)$, i.e., all the two contexts $C_i$ and $C_j$, are present, the $C_i$ and $C_j$ are defined as an overlapped context. In other cases, that is, for all i and j that are i≠j, the contexts $C_i$ and $C_j$ satisfying $T_i \cap T_j = \emptyset$ are defined as a disjoint context.

[Method for Generating Context Hierarchy According to Exemplary Embodiment of Invention]

FIG. 1 is a flow chart showing a method for generating a context hierarchy according to an exemplary embodiment of the present invention.

Hereinafter, the method for generating a context hierarchy according to an exemplary embodiment of the present invention will be described below with reference to FIG. 1.

First, a frequent itemset tree is generated by performing first frequent itemset mining on continuously generated transactions (S101).

The frequent itemset tree, which is a data hierarchy of a tree shape including the frequent itemsets and the support information thereof that are the results of performing the first frequent itemset mining, may be the frequent itemset tree of the prefix tree shape generated through the above-mentioned estDec method. A depth of each node included in the frequent itemset tree is closely connected with the corresponding node, i.e., the support of the frequent itemset and the frequent item having the high support is disposed at an upper rank, as compared with the frequent item having the low support.

The frequent itemset tree generated through the estDec method is generated at a very efficient hierarchy to obtain the support change amount of each frequent item that have a parent-child relation. Based on the information structure, the extension of the existing context stops based on the frequent item showing the support changing velocity of a specific value or less and the extension of the new context starts, such that the context detection satisfying the above-mentioned assumption 1 may be performed. In this case, it can be appreciated that the support changing velocity of a specific value or less according to the above Equation 1 arises from the difference in the support of the specific value or more, the difference in the support of two different contexts having a parent-child relationship is defined as a context distance, and the difference in the maximum support acting as a projection reference thereof is defined as a maximum context distance.

A context distance δ for the frequent itemset tree $P_x$ satisfies a condition of the following Equation 4 for the context set $C=\{C_1, C_2, \ldots, C_n\}$. $\delta_{max}$ in the following Equation 4 is a maximum context distance.

$$\delta = \begin{cases} |S(C_i) - S(C_j)| > \delta_{max}, i \neq j \\ |S(C_i) - S(C_j)| \leq \delta_{max}, i = j \end{cases} 0 \leq i, j \leq n$$ [Equation 4]

Figure 2:
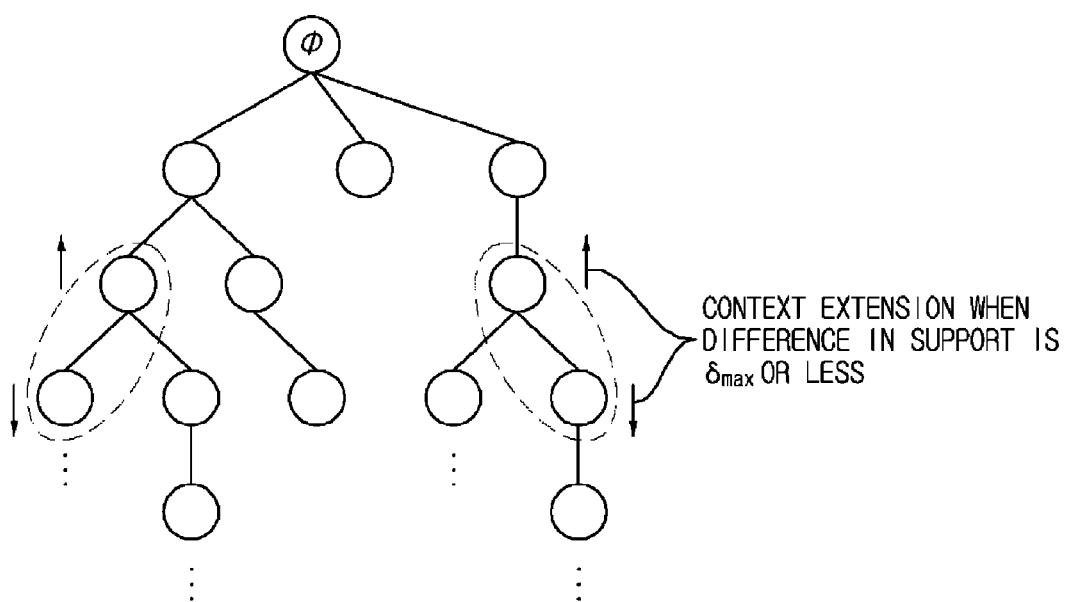
FIG. 2 is a diagram showing a context extension shape on a frequent itemset tree in the exemplary embodiment of the present invention.

FIG. 2 shows an example of a shape of performing the context extension that includes the corresponding itemset in the context only in the case where the difference in the support on the frequent itemset tree is an itemset smaller than the maximum context distance $\delta_{max}$. The context appropriate for the entire domain is detected by circulating all the frequent itemset trees and finding only the frequent itemsets where the difference in the support is the maximum context distance or less to perform the context extension by using the context extension method.

Next, the frequent itemset tree is vertically projected into a plurality of boundaries according to the context range (S102).

That is, after a limit for the difference in the maximum support capable of configuring a single context, that is, the context range is set, the frequent itemset tree is vertically projected into a plurality of boundaries according to the context range and only the frequent items included in the same boundary among each boundary that is projected may be included in the same context, thereby coping with the excessive extension of the specific context. In this case, the exemplary embodiment of the present invention may flexibly apply the context range value according to the characteristics of the corresponding domain by directly designating the context range value by the user.

The context range is marked by l as a projection range for vertically projecting the frequent itemset tree, that is, the support range, the boundary between the respective boundaries of the frequent itemset tree projected according to the context range value is referred to as a context boundary, a context upper bound of the context boundary is marked by Supper, and a context low bound thereof is marked by Slow.

Figure 3:
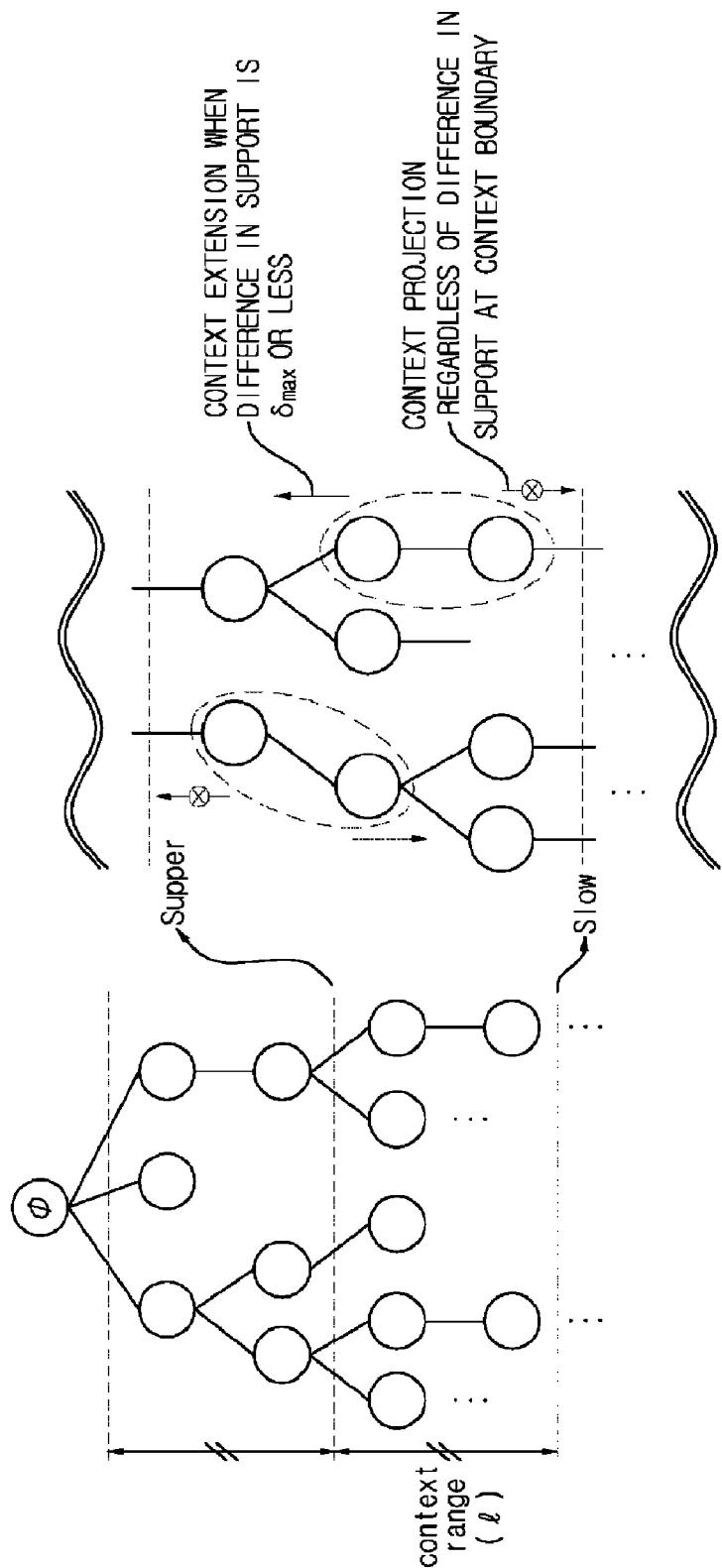
FIG. 3 is a diagram showing an example of context extension and context separation on a frequent itemset tree vertically projected according to a context range in the exemplary embodiment of the present invention.

FIG. 3 shows an example of a method of limiting context extension by applying the context range to the frequent itemset tree. Referring to FIG. 3, the contexts cannot extend any more regardless of the difference in the support based on the upper bound and the lower bound of the context boundary divided according to the context range and the forcing context separation is performed at the upper bound and the lower bound.

Next, new first transactions of each boundary are generated by assigning an index to basic itemsets of each boundary (S103), new frequent itemset trees of each boundary are generated by performing second frequent itemset mining on the new first transactions (S104), ones of frequent itemsets of the new frequent itemset trees are detected as a single context when the difference in the support is a predetermined value or less, and the context tree of the hierarchical structure is generated based on the detected contexts (S105).

That is, a unique identifier is assigned to each of the itemsets having the highest support included in the corresponding boundary and when the itemset is included in each tuple of the first transaction, after the new first transaction is generated by replacing the unique identifier with the corresponding identifier and the new frequent itemset tree is generated by performing second frequent itemset mining based on the first transaction, the context detection is performed by detecting the frequent items that the support changing velocity at the new frequent itemset tree is the maximum context distance or less to perform the context detection, thereby generating the context tree of the hierarchical structure based on the detected contexts.

Since the candidate sets are generated from all the branches included in each context boundary of the first frequent itemset tree and the unique identifier is assigned to the candidate sets and then, the second frequent mining is performed based thereon, the loss of information caused from the process is not present. This is due to the characteristics of the estDec algorithm where the specific node of the frequent itemset tree has other nodes representing the same item as a sibling node of its own parent node. In addition, since the size of the new frequent itemset tree may be reduced by setting the minimum support of the second frequent itemset mining to the low bound value of the context boundary during this process, the efficiency is also apparent. Further, when using the second frequent itemset mining, the frequent itemsets having different highest supports included in each context boundary are extracted by circulating the tree only once and may be used to generate the new first transaction, such that the efficiency is increased. In addition, since the overlapping found at the second frequent itemset mining result tree may be minimized by previously removing the frequent itemsets that are overlappingly found at this timing, and the overlapping found at the second frequent itemset mining result tree may be minimized by previously removing the frequent itemsets found at the first transaction, and since the new first transactions are generated through the identifiers assigned to the frequent itemsets found at the first transaction, the new first transactions for the second frequent itemset mining have the considerably small number of average items included therein, such that the efficiency is increased.

Figure 4:
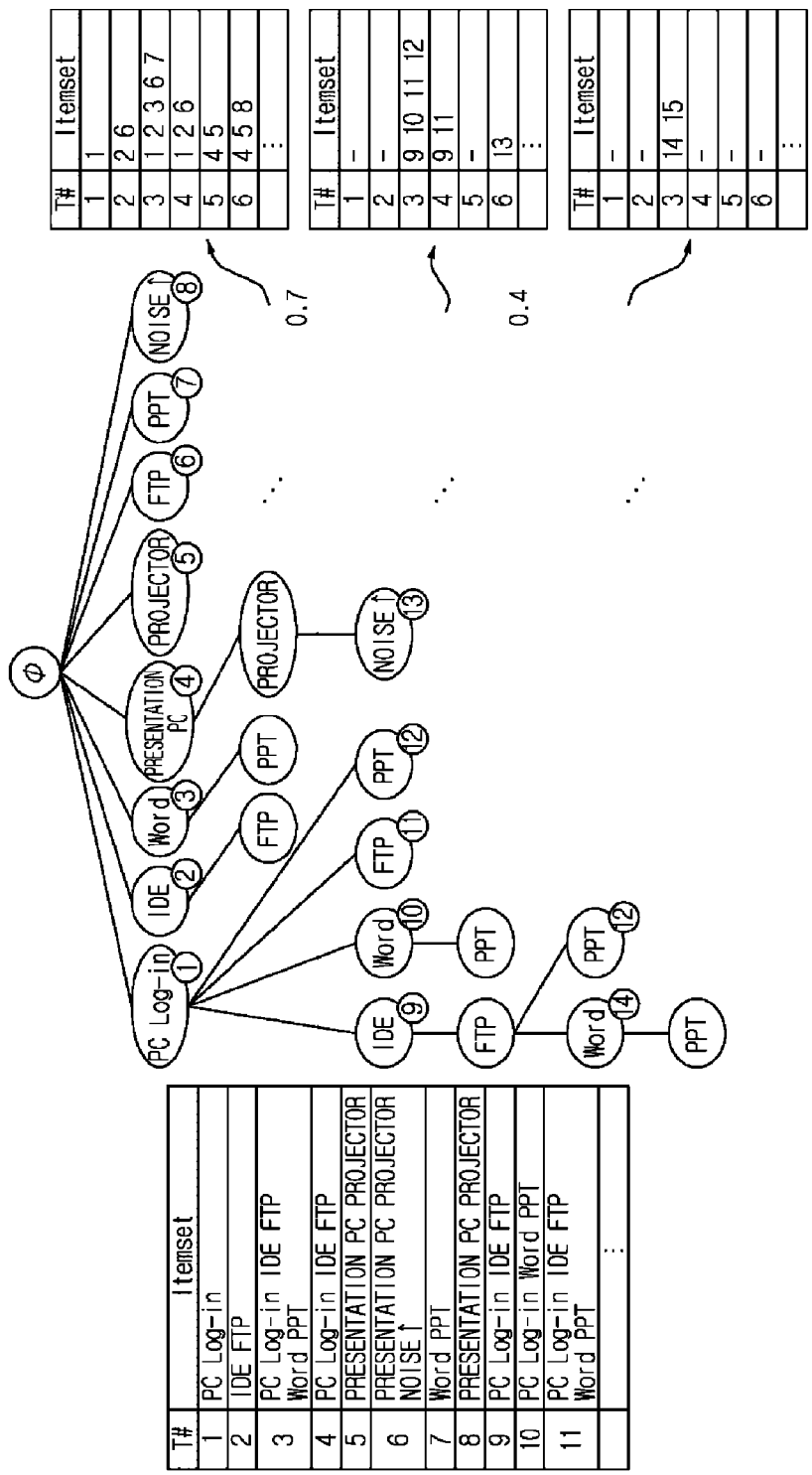
FIG. 4 is a diagram showing an example of new transactions generated by assigning indexes to basic itemsets of each boundary of the frequent itemset trees vertically projected in the exemplary embodiment of the present invention.

FIG. 4 shows an example of the new first transaction for each boundary of the frequent itemset tree generated from each of the first transactions and FIG. 5 shows an example of the new frequent itemset tree that is the results of the second frequent itemset mining performed through the first transaction of FIG. 4. The new frequent itemset tree of each boundary of FIG. 5 has the minimum support that is equal to the low bound of the context boundary of the corresponding boundary and in the case of 2 and 6, 3 and 7, and 4 and 5 of boundary 1, 9 and 11 and 10 and 12 of boundary 2, and 14 and 15 of boundary 3, the difference in the support of the corresponding items is the maximum context distance or less, such that the itemset trees are detected as a single context.

In the frequent itemset vertically projected into the plurality of boundaries according to the context range as described above, the new first transactions of each boundary are generated by assigning the index to the basic itemsets of each boundary, the new frequent itemset trees of each boundary are generated by performing the second frequent itemset mining on the new first transactions, and the context detection method detecting ones of the frequent itemsets of the new frequent itemset trees as a single context is performed when the difference in the support is a predetermined value or less, thereby generating the context tree having the hierarchical structure.

That is, the contexts detected through the context detection method have a parallel or hierarchical structure to each other and one representing this structure as the tree shape is a context tree.

In more detail, when the first transaction T and the context set $C=\{C_1, C_2, \ldots, C_n\}$ are given, a semantic upper and lower relation is present between the contexts configuring the C and the tree structure configured according to the inclusion relationship is defined as the context tree. In this case, the context tree has the following characteristics.

1) the uppermost is provided with the route node having a null value.
2) the tree includes all the detected contexts, each node of the tree has a 1:1 relationship with the context and includes the frequent itemset information and the propriety evaluation numeric information included in the corresponding context.
3) the context having the higher support among the contexts found at the same branch on the frequent itemset tree is configured as the parent node and the context having the lower support is configured as the child node.
4) the contexts found at different branches on the frequent itemset tree are configured at different branches even at the context tree.

Figure 6:
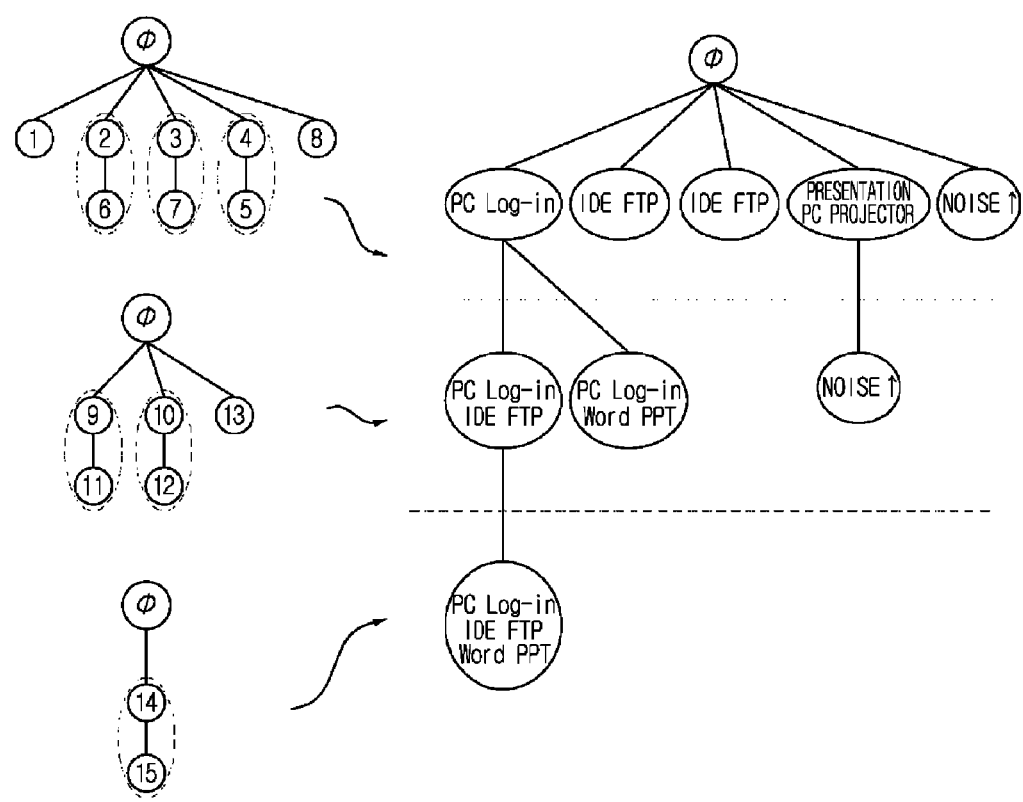
FIG. 6 is a diagram showing an example of a context tree generated by using a new frequent itemset tree of each boundary of FIG. 5.

FIG. 6 shows an example of the context tree generated according to the above characteristics 1) to 4) of the context tree from the new frequent itemset tree of FIG. 5. The context tree configured of all the detected contexts includes three measurement values of the numeric information for the propriety evaluation, that is, cohesion degree, continuous power, and boundary purity.

The cohesion degree (CD), which is an evaluation measure for a simultaneous generation rate of the frequent items included in the single context, has a measurement value for each context. The cohesion degree may highly evaluate the precision of the corresponding context as the frequent items included in the specific context are simultaneously generated at the high probability.

When the context $C_x$ and the set $\{i_1, i_2, \ldots, i_k\}$ of the items included in the $C_x$ are given, the cohesion degree (CD) of the $C_x$ is defined as the following Equation 5.

$$CD = 1 - \frac{\max(i_k) - \min(i_k)}{\{item_{cnt}(C_x) - 1\} \times \delta} \text{(However, } 1 \leq k \leq n) \quad \text{[Equation 5]}$$

In the above Equation 5, $item_{cnt}$ is the number of items belonging to the context C.

The continuous power (CP) is calculated by applying a concept of conditional probability to the hierarchy of the context tree, that is, calculated at the generation rate of the child context under the condition that the parent context is generated. When the parent context is generated, the semantic correlation may be highly evaluated as the child context has the high continuous power.

When the context $C_x$ and the context $C_y$ corresponding to the child node of the $C_x$ on the context tree are given, the continuous power (CP) of the $C_y$ is defined as the following Equation 6.

$$CP = P(S(C_y) \mid S(C_x)) = \frac{S(C_y)}{S(C_x)} \quad \text{[Equation 6]}$$

The boundary purity (BP), which digitalizes the purity of the contexts found in the determined boundary, has the higher boundary purity as the components forming each context are included in the smaller number of contexts and has the lower boundary purity as the components are commonly included in the larger number of contexts. The boundary purity for the specific first transaction is defined by the following Equation 7 and the boundary purity for the entire first transaction is defined by the following Equation 8.

$$BP = 1 - \sum_{j=1}^{m} -P_{(C_j)}\left(\log_2 P_{(C_j)}\right) / \log_2 m \quad \text{[Equation 7]}$$

$$BP = \sum_{i=1}^{n} \frac{1}{n}\left(1 - \sum_{j=1}^{m} -P_{(C_j)}\left(\log_2 P_{(C_j)}\right) / \log_2 m\right) \quad \text{[Equation 8]}$$

At the above Equations 7 and 8, C is a j-th context, m is the number of contexts included in the corresponding boundary, and n is the number of entire first transactions.

Next, the context hierarchy is built by applying the bottom-up context detection method to the context tree acquired during the previous step.

In more detail, after the lowermost layer having the context hierarchy is generated by assigning a new name only to the contexts selected among the context trees acquired during the previous step (S106) and then, the new second transaction for the subsequent layer is generated as a new name assigned during the previous step and the new context tree is generated (S107), it is determined whether there are selectable contexts among the contexts of the new context tree (S108) and if not, the generation of the context hierarchy ends (S110) and if so, the appropriate contexts are selected to assign the new name to each context and the subsequent layer having the context hierarchy is generated (S109) and then, the context detection is retrogressively performed.

That is, after extracting only the contexts to be considered at the subsequent layer that targets each node (context) of the context tree, assigning the new name corresponding to these meanings, and generating the subsequent layer having the context hierarchy, the context detection is retrogressively performed by configuring the new second transaction as the new name. In this case, in order to select the contexts to be used at the subsequent layer, the above-mentioned propriety evaluation elements (see the above Equations 5 to 7) are used.

In this case, the process of retrogressively performing the context detection includes a process of generating the new context tree by performing third frequent itemset mining on the second transaction after generating the new second transaction for the subsequent layer as the new name assigned during the previous step.

Figure 7:
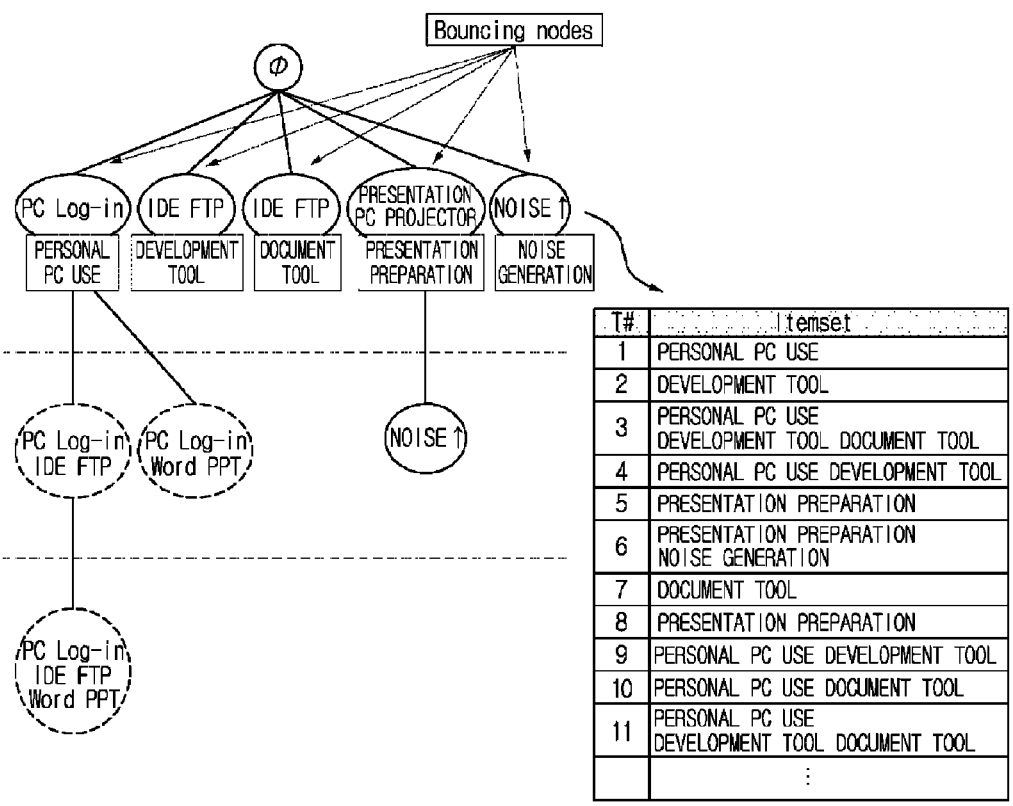
FIG. 7 is a diagram showing an example of assigning a new name to selected situations in a context tree of FIG. 6 and an example of new transactions generated based on the example.

FIG. 7 shows an example of assigning the new name to the selected contexts from the context tree of FIG. 6 and generating the new second transaction based thereon. The bottom-up context detection method sequentially generates each layer from the lowermost layer from the contexts having the abstractive meanings to the contexts having the gradually detailed meanings according to the following order.

That is, 1) after the contexts that are considered to be semantically valued are selected according to the propriety evaluation result or the selection of the user among each context of the context tree prepared through the context detection method, 2) one layer to be included in the context hierarchy is configured of the selected contexts, the new second transaction for the subsequent layer is generated using only the contexts, and the new context tree is prepared by reapplying the above-mentioned context detection method.

3) the appropriate contexts are selected once again among each context of the context tree prepared at the above 2) according to the propriety evaluation results or the selection of the user, and 4) the processes of 2) and 3) are repeated up to the timing when the selectable context does not appear any more and each layer is sequentially configured up to reaching the uppermost layer.

FIG. 8A shows an example of re-performing the context detection method based on the new second transaction generated in FIG. 7 to generate the new context tree of the subsequent upper layer and FIG. 8B is a new context tree that assigns the new name to the selected contexts among the contexts of the new context tree of FIG. 8A and is configured of the new second transaction generated based thereon. As can be seen from the examples of FIGS. 7 and 8, the method of configuring each upper layer is the same as the method of configuring the original layer and each context tree is generated and then, the corresponding layer targeting only the selected contexts among the contexts included therein is configured. The bottom-up context detection method sequentially generates each layer from the lowermost layer from the contexts having the abstractive meanings to the contexts having the gradually detailed meanings by the above-mentioned methods.

FIGS. 9A and 9B show examples of an algorithm for performing the above-mentioned bottom-up context detection method.

The context hierarchy configured based on the contexts detected by the above-mentioned process, which is a final result comprehensively representing the semantic layer relationship of all the contexts detected through the context detection method, and provides the high readability and the efficient representation. The characteristics of the context hierarchy and the information included in each layer are defined as follows.

The context hierarchy is configured of each layer forming the hierarchy and the contexts included therein and additionally includes the information on the components inclusion relation between the contexts belonging to each layer and the context subordinate relationship to assist the user's understanding on the specific domain. The method of representing the context hierarchy has the following characteristics.

1) the context hierarchy is configured according to the hierarchical representation method and each layer is generated according to the retrogressive execution of the same context detection method.

2) the information on the component inclusion relation between the contexts included in each layer is maintained and is represented by a Venn diagram in principle.

3) each layer includes the cohesion degree and the purity calculation numeric information that targets the contexts included in each layer and the method of calculating the cohesion degree depends on the above Equation 5 and the method of calculating the purity depends on the above Equations 7 and 8.

Figure 10:
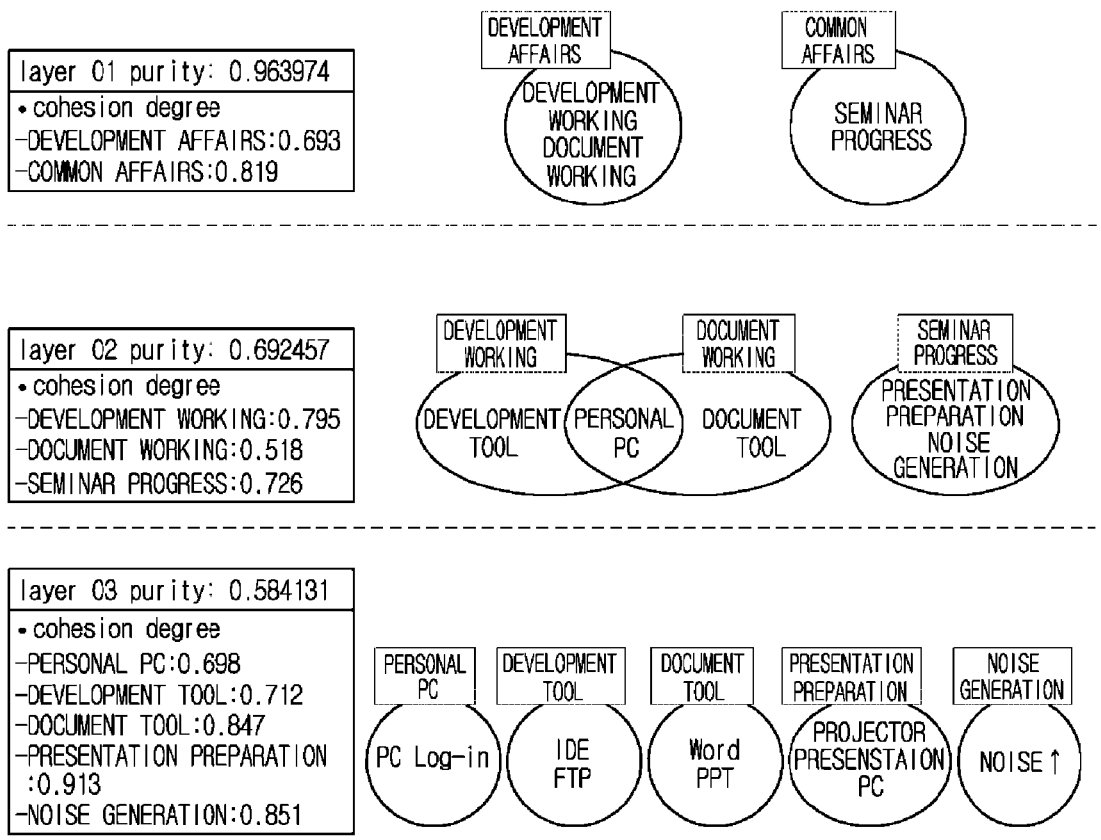
FIG. 10 is a diagram showing an example of generating a context hierarchy including a plurality of layers using the new context tree of each layer of FIGS. 7 and 8.

FIG. 10 shows a shape of the final context hierarchy acquired through the examples of the exemplary embodiment of the present invention as shown in FIGS. 4 to 8. The contexts selected from the first context tree configures the lowermost layer, the second layer is configured using the new second transaction newly prepared through the selected contexts, the second transaction is again generated using only the contexts included the second layer, and the uppermost layer is generated by the context detection method. Each layer having the context hierarchy represents the information on the component inclusion relation between the contexts using the Venn diagram and represents the information on the purity of each layer and the cohesion degree of each context together to assist the user's determination. In addition, when additionally calculating the information on the logical subordinate relationship between the contexts included in each layer, a larger amount of information can be provided.

As described above, the exemplary embodiment of the present invention is an active method that derives only the items estimated as the single context as results to increase the readability of the final results and can efficiently derive the correlation between the detected contexts, the hierarchical relation, etc.

[Recording Medium Recorded with Program Implementing Method for Generating Context Hierarchy According to Exemplary Embodiment of Present Invention]

Meanwhile, the method for generating a context hierarchy according to the exemplary embodiment of the present invention may be implemented by a general-purpose digital computer operating programs by using a recording medium that can be prepared with programs executable in a computer and read with a computer. The recording medium readable with a computer includes a storage medium such as a magnetic storage medium (for example, ROM, floppy disk, hard disk, magnetic tape, etc.), an optical reading medium (for example, CD-ROM, DVD, optical data storage device, etc.), and a carrier wave (for example, transmission through Internet).

[System for Generating Context Hierarchy According to Exemplary Embodiment of Present Invention]

Hereinafter, a system for generating a context hierarchy according to an exemplary embodiment of the present invention will be described with reference to FIG. 11.

Figure 11:
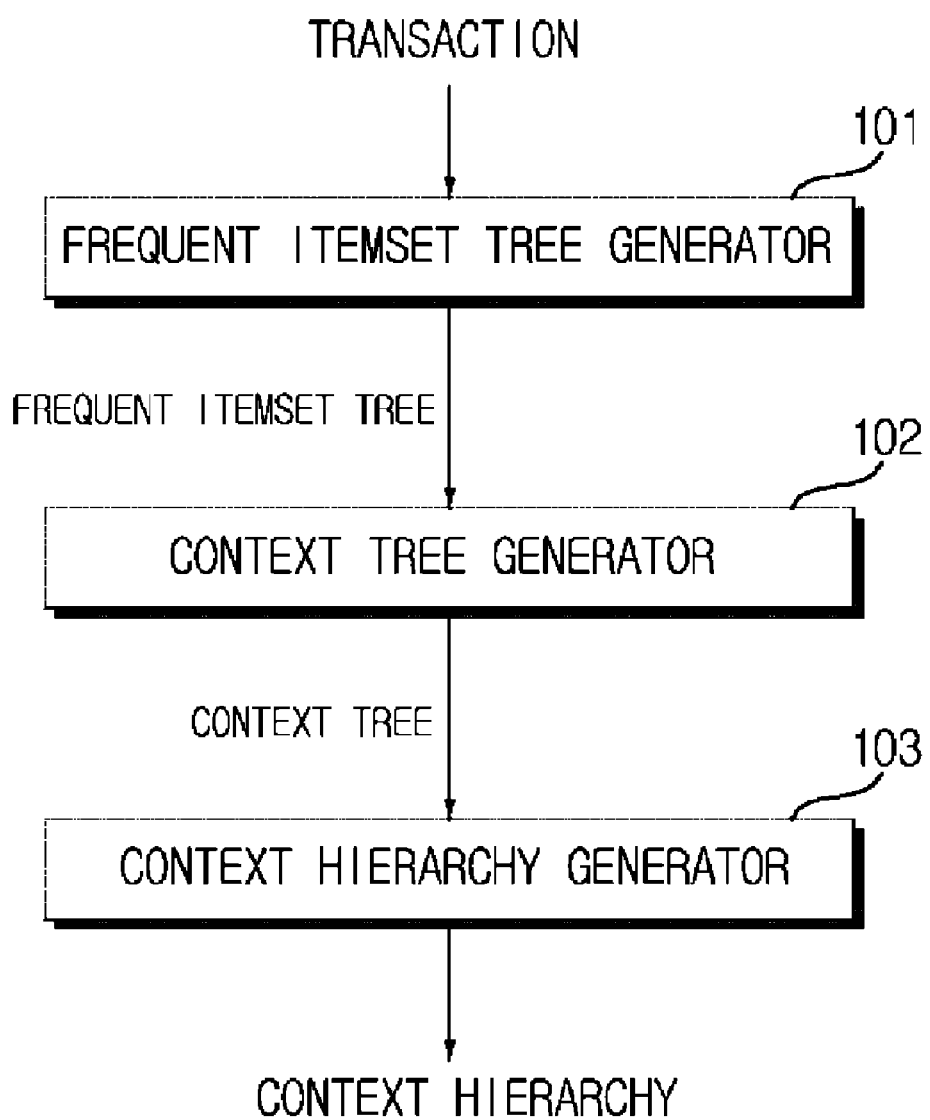
FIG. 11 is a block diagram showing a system for generating a context hierarchy according to an exemplary embodiment of the present invention.

FIG. 11 shows a block diagram of a system for generating a context hierarchy according to an exemplary embodiment of the present invention.

Referring to FIG. 11, a frequent itemset tree generator 101 performs the first frequent itemset mining on the continuously generated transactions to generate the frequent itemset tree. The frequent itemset tree generator 101 may use the estDec method as a unit for generating the frequent itemset tree and the operation and characteristics of the frequent itemset tree generator is the same as the description associated with S101 of FIG. 1 described above and therefore, the detailed description thereof will be omitted.

A context tree generator 102 vertically projects the frequent itemset tree generated in the frequent itemset tree generator 101 into the plurality of boundaries, assigns the index to the basic itemsets of each boundary to generate the new first transaction and the new frequent itemset trees of each boundary and then, detects ones of the frequent itemsets of the new frequent itemset trees as a single context when the difference in the support is a predetermined value or less and generates the context tree having the hierarchical hierarchy based on the detected contexts. The operation and characteristics of the context tree generator 102 are the same as the description associated with steps S102 to S105 of FIG. 1 and FIGS. 2 to 6 described above and therefore, the description thereof will be omitted.

The context hierarchy generator 103 builds the context hierarchy by applying the bottom-up context detection method to the context tree from the context tree generator 102. The operation and characteristics of the context hierarchy generator are the same as the description associated with steps S106 to S110 of FIG. 1 and FIGS. 7 to 10 described above and therefore, the description thereof will be omitted.

[Performance Verification of Exemplary Embodiment of Present Invention]

Hereinafter, an experiment for verifying the performance of the exemplary embodiment of the present invention and the results thereof will be described with reference to FIGS. 12 to 28.

In the experiment, when generating the frequent itemset tree that is a basic of the context detection method, the estDec algorithm was used and the minimum support $S_{min}$ for mining the frequent itemsets was proposed in each experiment. In addition, when $S_{sig}$ is defined by a relative value for $S_{min}$ and when the threshold value $S_{sig}$ is represented by p %, a real value of $S_{sig}$ is $S_{min} \times (p/100)$. All the experiments were experimented in dual core 2.0 GHz computer having a memory of 2 GB and Linux Kernel 2.6.26 and C language was used to implement program. Data used in the experiments are data on breast cancer from a medical collage of Wisconsin and data on orphanage supporter. Both data are selected considering that each classification result indicates different contexts. This is for evaluating the accuracy based on a probability that the bottom-up context detection method correctly classifies the contexts.

First, experiment 1 for verifying the performance of the exemplary embodiment of the present invention and the results thereof will be described with reference to FIGS. 11 to 19.

Figures 12, 13:
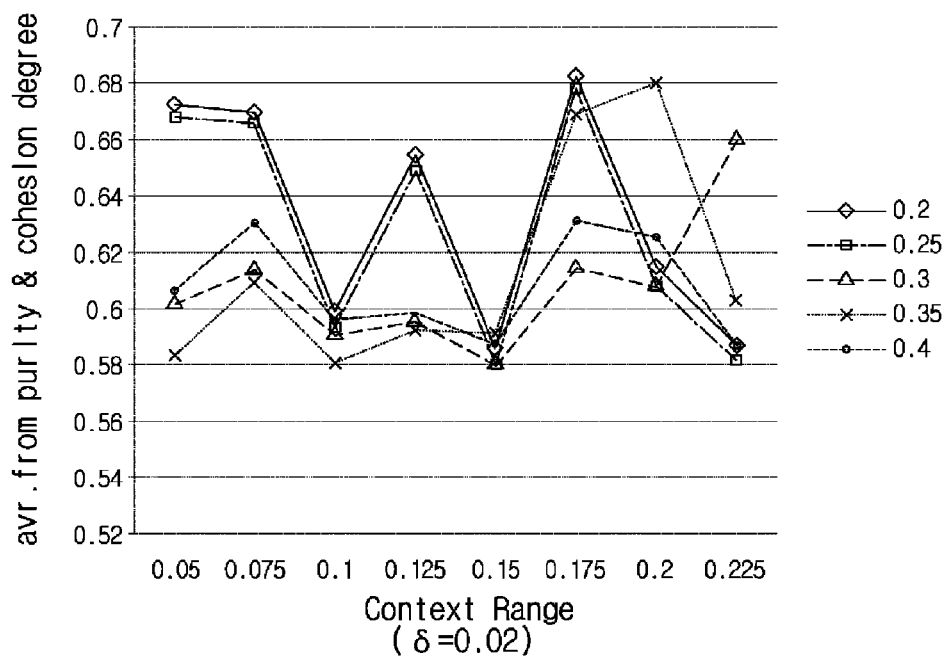

Experiment 1 was performed through the data on the breast cancer that is measured by Dr. William and H. Wolberg of a medical college of Wisconsin and is provided by Olvi Mangasarian and performed the context detection as 9 attributes other than Sample code number and Class among a total of 11 attributes. The detailed matters of each attribute are as shown in FIG. 12. The provided data is configured of a total of 699 instances and incomplete 16 instances are previously removed to use a total of 683 instances. The experiment was performed by a method that optionally extracts 546 instances corresponding to 80% of a total of instances to perform the context detection and then, measures the accuracy of the contexts detected with the remaining 137 instances.

FIG. 13 shows the experiment results while changing the minimum support $S_{min}$ value and the context range l value in the state where the maximum context distance is fixed to 0.02 and $S_{sig}$ is fixed to 10% and each series implies $S_{min}$.

In order to evaluate the context detected in the experiment of FIG. 13, the average of the purity and the cohesion degree was used as the evaluation measurement value and each graph of the purity and the cohesion degree is the same as FIGS. 14A and 14B.

Through the results of the FIGS. 13 and 14, it can be appreciated that when the context range l is 0.175, the maximum measurement value at $S_{min}$ of 0.2 was found and when the context range l is 0.15, the minimum measurement value was found at $S_{min}$ of 0.3. When $S_{min}$ is 0.3, since the purity is not low at the boundary where l is 0.15 but the cohesion degree has a low value, the boundary becomes a boundary where the entire evaluation measurement value the minimum. On the other hand, the boundary where $S_{min}$ is 0.2 and l is 0.175 has the high values of the purity and cohesion degree, such that it becomes a boundary where the entire evaluation measurement value is the maximum.

FIG. 15A shows is a graph showing the change in the evaluation measurement value according to $S_{min}$ when the l value is fixed to 0.175 and shows that the evaluation measurement value has the maximum value when δ is 0.2. FIG. 15B shows a changing shape of the evaluation measurement value according to various δ values in the state where the l value is fixed to 0.175 and the $S_{min}$ value is fixed to 0.2. As a result, it can be appreciated that in the bottom-up context detection method, the evaluation measurement value corresponds to the maximum when $S_{min}$=0.2, l=0.175, and δ=0.02 for the corresponding data set and the evaluation measurement value corresponds to the minimum when $S_{min}$=0.3, l=0.15, and δ=0.03.

FIG. 16 shows the results of measuring the accuracy through the remaining 137 instances that are not used in the context detection for the context hierarchies having various levels of evaluation measurement values in the experiment of FIG. 13. The accuracy of each of two classes included in all the data and the accuracy for the entire data were represented by (a) the highest measurement value, (b) a slightly above measurement value, (c) a slightly below measurement value, and (d) the lowest measurement value. In the case of the slight above measurement value, $S_{min}$=0.4 and l=0.175 were used, in the case of the slight below measurement value, $S_{min}$=0.3 and l=0.175 were used, and the above-mentioned values were used as the highest measurement value and the lowest measurement value.

Each context included in the context hierarchy configured through the experiment of FIG. 13 represents one of two classes of begin and malignant. In this case, when the specific context for the entire data set purely belongs to only a class, the context clearly represents only the corresponding class and when the context belonging to all of the two classes is generated, the class having the high ratio is selected according to the generation frequency, which represents the corresponding class. The distribution of the results derived from the contexts purely belonging to only one class for all the results of FIG. 16 and the results derived from the otherwise contexts is represented by being divided into a precise ratio and a presumption ratio. As a result, it can be appreciated that when the experiment was performed with the context hierarchy having the highest evaluation measurement value, the entire precision is high and the ratio predicted from the precise context among the prediction methods configuring the accuracy is very high. It can be appreciated that when the experiment was performed with the context hierarchy having the lowest evaluation measurement value, the entire accuracy is reduced to the predetermined level and the ratio predicted from the presumption context among the prediction methods configuring the accuracy is slightly increased. In addition, it can be appreciated that when the experiment was performed with the context hierarchy having the slightly above measurement value and the experiment was performed the context hierarchy having the slightly below measurement value, there is the accuracy between the highest and lowest ranges. Next, FIG. 17A shows one that easily compares the results of each case of FIG. 16. As a result, it can be appreciated that the entire accuracy is also reduced with the reduction in the evaluation measurement value.

Meanwhile, as the context hierarchy is configured well, it is preferable that the contexts configuring the corresponding layer clearly belongs to only a class as rising to the upper layer, which implies that the ratio of the precise context among the contexts configuring the corresponding layer, that is, the disjointness is high.

FIG. 17B shows the comparison experiment results for the disjointness value for each layer having each context hierarchy of FIG. 16. When the number of all the contexts included in the corresponding layer is 100%, the disjointness shows the ratio of the precise context. It can be appreciated that in the case of the context hierarchy having the highest evaluation measurement value, the disjointness of the uppermost layer reaches 100% and the ratio thereof is degraded as going to the lower layer and in the case of the context hierarchy having the lowest evaluation measurement value, even the disjointness of the uppermost layer is about 88%.

FIG. 18 is a diagram showing experiment results of comparing precision calculated through a bottom-up context detection algorithm and precision of other representative classification algorithms and a neural network algorithm. The experiment has been progressed in a manner that the data corresponding to 80% of all the data are optionally extracted to be used as learning data and 20% of the remaining data is used as the experiment data and the precision of FIG. 18 was represented as an average value of each result obtained by repeating the process twenty times. The detailed parameter history used in each algorithm is as shown in FIG. 19.

As a result of the experiment, the bottom-up context detection algorithm according to the exemplary embodiment of the present invention shows the higher precision in average than other representative classification algorithms except for the neural network algorithm. The neural network algorithm shows the precision higher than the context detection algorithm, but it is impossible to simply compare the performance considering only the precision in terms of the application field and the physical performance, that is, the run time, the memory usage, etc. When the exemplary embodiment of the present invention uses the lower minimum support within the range allowed by the system using the frequent itemsets, it is predicted to derive the higher precision.

Hereinafter, experiment 2 for verifying the performance of the exemplary embodiment of the present invention will be described with reference to FIGS. 20 to 25.

Figures 20, 21:
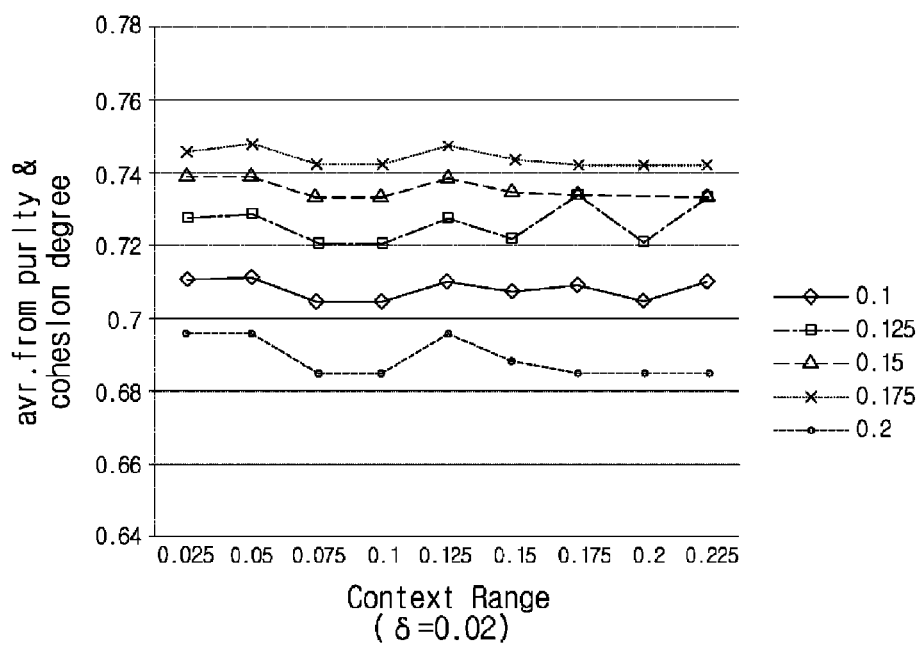

Experiment 2 used the child care center supporter data that are provided by Vladislav Rajkovic, and 13 persons and Marko Bohanec and Blaz Zupin and the data are configured of a total of 8 attributes. All the attributes are configured of categorical data. The detailed matters of each attribute are as shown in FIG. 20. The provided data are configured of a total of 12958 instances and four classes configuring the instances each are not_recom, very_recom, priority, and spec_priority. The experiment was performed by a method that optionally extracts 10366 instances corresponding to 80% of a total of instances to perform the context detection and then, measures the accuracy of the contexts detected with the remaining 2592 instances. FIG. 21 shows the experiment results while changing the minimum support $S_{min}$ value and the context range l value in the state where the maximum context distance is fixed to 0.02 and $S_{sig}$ is fixed to 10% and each series implies the $S_{min}$ value.

The experiment of FIG. 21 used the average of the purity and the cohesion degree as the evaluation measurement value in order to evaluate the detected context, similar to the above-mentioned experiment 1. Through the results of the FIG. 21, it can be appreciated that when the context range l is 0.125, the maximum measurement value was found at $S_{min}$ of 0.175 and when the context range l is 0.1, the minimum measurement value was found at $S_{min}$ of 0.2. The optimal δ value was obtained in the same manner as the above experiment 1. As a result, in order to perform the accuracy comparison experiment, parameters for obtaining the highest measurement value, the slightly above measurement value, the slightly below measurement value, and the lowest measurement value are each selected in the boundary where $S_{min}$ is 0.175 and l is 0.125, the boundary where $S_{min}$ is 0.125 and l is 0.125, the boundary where $S_{min}$ is 0.1 and l is 0.125, and the boundary where $S_{min}$ is 0.2 and l is 0.1.

Figure 22:
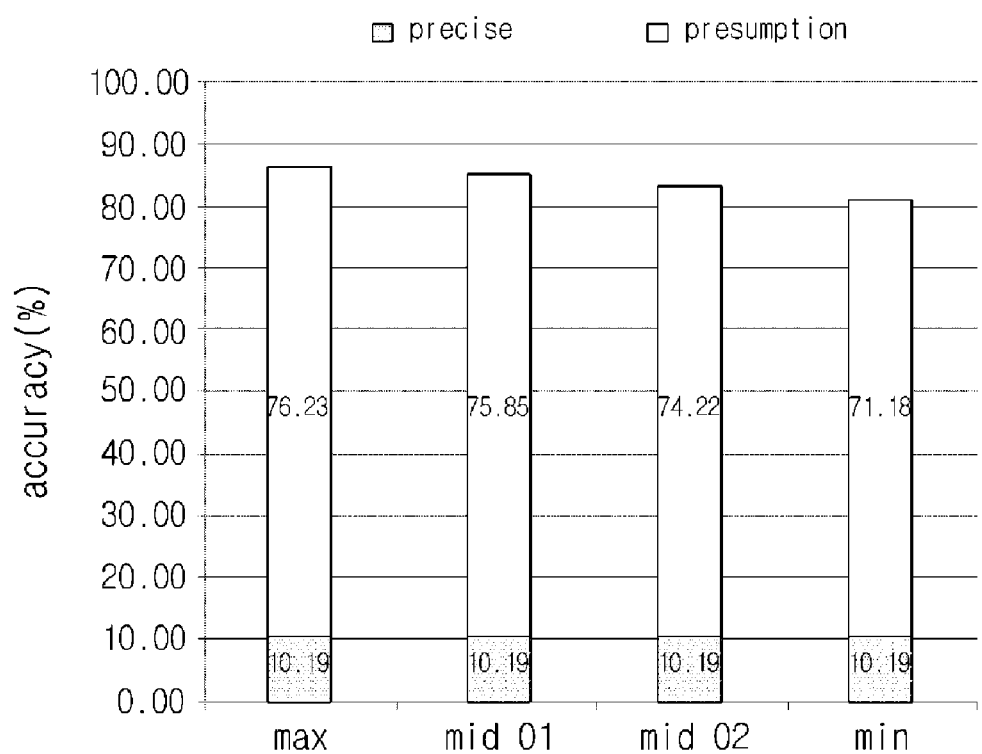

FIG. 22 shows the results of measuring the accuracy through the instances corresponding to the remaining 20% that are not used in the context detection for the context hierarchies having various levels of evaluation measurement values in the experiment of FIG. 21. The precision accuracy of all the data for each of the highest measurement value, the slightly above measurement value, the slightly below measurement value, and the lowest measurement value is represented by being divided at the probability matched with the precise context and the presumption context. The classification method for the precise context and the presumption context is the same as the above experiment 1.

Referring to the experiment results of FIG. 22, it can be appreciated that the entire accuracy is high when the experiment was performed with the context hierarchy having the highest evaluation measurement value and the entire accuracy is low as going to the context having the lowest evaluation measurement value. In addition, the experiment has the precise context where the single class among the four classes is uniquely included without overlapping with other classes and since all the remaining three classes are configured of the presumption context without the precise context, the ratio of the results measured from the precise context is the same in all the experiments. Similar to the above experiment 1, it can be appreciated that when the experiment was performed with the context hierarchy having the slightly above measurement value and the experiment was performed the context hierarchy having the slightly below measurement value, there is the accuracy between the highest and lowest ranges. Next, FIG. 23A shows one that easily compares the results of each case of FIG. 21. It can be appreciated that the entire accuracy is also reduced with the reduction in the evaluation measurement value.

Meanwhile, as the context hierarchy is configured well, it is preferable that the contexts configuring the corresponding layer clearly belongs to only a class as rising to the upper layer, which implies that the ratio of the precise context among the contexts configuring the corresponding layer, that is, the disjointness is high.

FIG. 23B shows the comparison experiment results for the disjointness for each layer having each context hierarchy of FIG. 21.

Since a class clearly divided in terms of the characteristics of the data used in the experiment is only one and the remaining classes have all the sharing contexts, even in the case of the context hierarchy having the maximum measurement value, it can be appreciated that the disjointness thereof has only the maximum value of 50%. However, the disjointness is being reduced in the case of the context hierarchy having the low evaluation measurement value and in the case of the context hierarchy having the lowest evaluation measurement value, the disjointness shows 0% even at the first layer.

FIG. 24 is a diagram showing experiment results of comparing precision calculated through a bottom-up context detection algorithm and precision of other representative classification algorithms and a neural network algorithm. Similar to experiment 1, the experiment method has been progressed in a manner that the data corresponding to 80% of all the data are optionally extracted to be used as learning data and 20% of the remaining data is used as the experiment data and the precision of FIG. 24 was represented as an average value of each result obtained by repeating the process twenty times. The detailed parameter history used in each algorithm is as shown in FIG. 25.

As a result of the experiment, the proposed bottom-up context detection algorithm shows the higher precision in average than other representative classification algorithms except for the neural network algorithm. Similar to the above experiment 1, although the neural network algorithm shows the higher precision than the context detection algorithm, it is impossible to simply compare the performance considering only the accuracy in terms of the application field and the physical performance, that is, the run time, the memory usage, etc. When using the lower minimum support within the range allowed by the system in terms of the characteristics of the proposed method using the frequent itemset, it is predicted to derive the higher accuracy.

Hereinafter, experiment 3 for verifying the performance of the exemplary embodiment of the present invention will be described with reference to FIGS. 26 to 28.

Experiment 3, which is an experiment for evaluating the physical performance of the algorithm, was progressed in a manner of measuring the number of contexts found in the performance results, the number of overlapping contexts, and the run time and the maximum memory usage according to the change in length of the transactions. The data sets used for the experiment are artificially generated to meet objects of each experiment. Each of the data sets is configured of a total of 10000 transactions and in the case of the number of contexts, the number of overlapping contexts, and the length of the transactions, the values are the same as specified in each experiment. All the experiments were performed using the value where the context range is 0.2, the maximum context distance is 0.05, $S_{min}$ is 0.05, and $S_{sig}$ is 10%. The experiment object is up to the timing of collectively detecting a three-layer context, the experiment result includes only the run time of the context detection algorithm except for the estDec algorithm run time, and the results were prepared by comparing the average value according to the execution results of a total twenty times per each experiment.

FIG. 26 shows one that compares the performance according to the change in the number of contexts under the conditions where the average length of the transactions is fixed to 10 and the overlapping context is not included. One represented as an example implies the number of different items included in the data set. Generally, it can be appreciated that as the number of different items is increased and the number of contexts is also increased, the run time is also increased. This is because when the number of contexts or the number of items included in each context is increased, the operation to be processed by the algorithm is also increased in proportion thereto, and the run time is slightly irregular due to the noises added to the transactions but the entire increase trend may be clearly confirmed. The maximum memory usage is affected by the number of all items included in all the contexts, such that when the total number of different items is constant, it can be appreciated that the number of contexts detected therethrough does not greatly affect the results.

FIG. 27 shows one that compares the run time with the maximum memory usage as the number of overlapping contexts is increased after the number of all contexts is fixed to 10 and the average length of the transactions is fixed to 10. When the number of overlapping contexts is increased, it can be appreciated that the context configuring the upper layer is increased and accordingly, the necessary operation is also rapidly increased and the number of different items included in the data set is also in proportion to the consumed run time. Due to the generation of the overlapping context through the comparison of the maximum memory usage, it can be appreciated that the maximum memory usage is also increased in proportion thereto as the context of the upper layer is increased.

FIG. 28 shows a comparison experiment of the run time and the maximum memory usage as the average length of the transactions is gradually increased in the state where the number of all contexts is fixed to 10 and shows that the increase trend of the consumed run time is relatively smooth in all the experiments. However, since the context detection algorithm is largely affected by the number of contexts, the number of overlapping contexts, etc., included therein, rather than the length of the transactions forming the data set, the detailed irregularity due to noise is variously shown due to the noise in the entire increase trend. The maximum memory usage is also affected by the number of all items included in all the contexts, such that when the total number of different items is constant, it can be appreciated that the contexts detected therethrough do not greatly affect the results.

As described above, the exemplary embodiments have been described and illustrated in the drawings and the specification. Herein, specific terms have been used, but are just used for the purpose of describing the present invention and are not used for defining the meaning or limiting the scope of the present invention, which is disclosed in the appended claims. Therefore, it will be appreciated to those skilled in the

What is claimed is:

1. A method for generating a context hierarchy, the method comprising:
    (a) vertically projecting a frequent itemset tree for continuously generated transactions into a plurality of boundaries and generating new first transactions and new frequent itemset trees of each boundary by assigning an index to basic itemsets of each boundary;
    (b) detecting ones of the frequent itemsets of the new frequent itemset trees as a single context when the difference in support is a predetermined value or less and generating a context trees of a hierarchical structure based on the detected contexts;
    (c) generating a lowermost layer having a context hierarchy by assigning a new name to only contexts selected in the context trees;
    (d) generating new second transactions for a subsequent layer as a new name assigned in a previous step and generating new context trees; and
    (e) determining that there are no selectable contexts in the contexts of the new context trees and if not, ending the generation of the context hierarchy and if so, repeatedly performing the process from step (d) after assigning the new name to each context by selecting appropriate contexts and generating the subsequent layer having the context hierarchy.

2. The method of claim 1, wherein, during step (a),
    generating a frequent itemset tree by performing first frequent itemset mining on continuously generated transactions; and
    generating new frequent itemset trees by performing second frequent itemset mining on new first transactions of each boundary.

3. The method of claim 1, wherein a reference vertically projecting the frequent itemset tree into a plurality of boundaries is a context range and the context range corresponds to a maximum value of the difference in support configuring a single context.

4. The method of claim 1, wherein during step (b), the predetermined value is a maximum context distance that is a maximum value of the difference in support between contexts.

5. The method of claim 4, wherein a context distance $\delta$ that is the difference in support between the contexts satisfies $$\delta = \begin{cases} |S(C_i) - S(C_j)| > \delta_{max}, i \neq j \\ |S(C_i) - S(C_j)| \leq \delta_{max}, i = j \end{cases}$$

(where, $C_i$ and $C_j$ are a set configured of contexts, $S(C_i)$ is the support of an i-th context, and $S(C_j)$ is the support of a j-th context, and $0 \leq i, j \leq n$).

6. The method of claim 1, wherein during step (b), each of the context trees includes frequent itemset information and propriety evaluation numeric information,
    the propriety evaluation numeric information includes a cohesion degree measurement value, a continuous power measurement value, and a boundary purity measurement value,
    the cohesion measurement value is an evaluation measure for a simultaneous generation rate of items included in the context and has a measurement value for each context,
    the continuous power measurement value is a generation rate of a child context under a condition where a parent context is generated, and
    the boundary purity measurement value digitalizes the purity of the contexts found within the determined boundary.

7. The method of claim 6, wherein the cohesion degree (CD) is defined by $$CD = 1 - \frac{\max(i_k) - \min(i_k)}{\{item_{cnt}(C_x) - 1\} \times \delta}$$

(where, itemcnt is the number of items belonging to the context $C_x$ and $i_k$ is one of a set $\{i_1, i_2, \ldots, i_k\}$ of items included in the context Cx, and $1 \leq k \leq n$).

8. The method of claim 6, wherein the continuous power (CP) is defined by $$CP = P(S(C_y) | S(C_x)) = \frac{S(C_y)}{S(C_x)}$$

(where $S(C_y)$ is a support of a parent context and $S(C_x)$ is a support of a child context).

9. The method of claim 6, wherein the boundary purity (BP) for the specific transaction is defined by $$BP = 1 - \sum_{j=1}^{m} -P_{(C_j)}(\log_2 P_{(C_j)})/\log_2 m$$

and the boundary purity for the entire transaction is defined by $$BP = \sum_{i=1}^{n} \frac{1}{n}\left(1 - \sum_{j=1}^{m} -P_{(C_j)}(\log_2 P_{(C_j)})/\log_2 m\right)$$

(where $C_j$ is a j-th context, m is the number of contexts included in the corresponding boundary, and n is the number of all the transactions).

10. The method of claim 1, wherein during step (c), the lowermost layer having the context hierarchy is generated by assigning a new name to only contexts selected by the propriety evaluation results or the user among the contexts of the lowermost layer having the context tree.

11. The method of claim 10, wherein the propriety evaluation result is determined by the propriety evaluation numeric information including the cohesion degree, the continuous power, and the boundary purity, the cohesion degree measurement value is the evaluation measure for the simultaneous generation rate of the items included in the context and has the measurement value for each context, the continuous power measurement value is the generation rate of the child context under the condition where the parent context is generated, and the boundary purity measurement value digitalize the purity of the contexts found within the determined boundary.

12. The method of claim 1, wherein step (d) includes:
(d1) generating new second transactions for a subsequent layer as a new name that is assigned at a previous step; and
(d2) generating a new context tree by performing a third frequent itemset mining on the second transactions.

13. The method of claim 1, wherein during step (e), if there is a selectable context among contexts of the new context tree, a new name is assigned to the selected contexts among the contexts of the new context tree by the propriety evaluation result or the user and the process is repeatedly performed from step (d).

14. The method of claim 1, wherein the context hierarchy includes the information on the component inclusion relationship between the contexts in each layer and is represented by a Venn diagram.

15. The method of claim 1, wherein each layer having the context hierarchy includes the cohesion degree measurement value and the purity measurement value for the contexts included in the corresponding layer.

16. A system for generating a context hierarchy, the system comprising:
a memory;
a frequent itemset tree generator generating frequent itemset trees for continuously generated transactions;
a context tree generator detecting ones of the frequent itemsets of the new frequent itemset trees as a single context when a difference in support is a predetermined value or less and generating the context tree having a hierarchical structure based on the detected contexts, after vertically projecting the frequent itemset trees into a plurality of boundaries and assigning indexes to basic itemsets of each boundary to generate new first transactions and new frequent itemset trees; and
a context hierarchy generator determining that there are no selectable contexts in the contexts of the new context trees and if not, ending the generation of the context hierarchy and if so, selecting the appropriately contexts to assign the new name to each context and after generating the subsequent layer having the context hierarchy, and repeatedly performing the process from a process generating new second transactions for a subsequent layer as the new name, after generating a lowermost layer having a context hierarchy by assigning a new name to only contexts selected in the context trees and generating new second transactions for a subsequent layer as a new name and generating new context trees.

17. The system of claim 16, wherein when generating new second transactions and new context trees, the context hierarchy generator performs context detection that includes a process that performs third frequent itemset mining on second transactions after generating the second transactions to generate new context trees.

18. A non-transitory computer-readable medium having computer-executable instructions for performing a method for generating a context hierarchy, the method comprising:
(a) vertically projecting a frequent itemset tree for continuously generated transactions into a plurality of boundaries and generating new first transactions and new frequent itemset trees of each boundary by assigning an index to basic itemsets of each boundary;
(b) detecting ones of the frequent itemsets of the new frequent itemset trees as a single context when the difference in support is a predetermined value or less and generating a context trees of a hierarchical structure based on the detected contexts;
(c) generating a lowermost layer having a context hierarchy by assigning a new name to only contexts selected in the context trees;
(d) generating new second transactions for a subsequent layer as a new name assigned in a previous step and generating new context trees; and
(e) determining that there are no selectable contexts in the contexts of the new context trees and if not, ending the generation of the context hierarchy and if so, repeatedly performing the process from step (d) after assigning the new name to each context by selecting appropriate contexts and generating the subsequent layer having the context hierarchy.

* * * * *